(12) United States Patent
Yuzurihara et al.

(10) Patent No.: US 11,929,668 B2
(45) Date of Patent: Mar. 12, 2024

(54) DC PULSE POWER SUPPLY DEVICE AND MAGNETIC SATURATION RESET METHOD FOR DC PULSE POWER SUPPLY DEVICE

(71) Applicant: KYOSAN ELECTRIC MFG. CO., LTD., Yokohama (JP)

(72) Inventors: Itsuo Yuzurihara, Yokohama (JP); Toshiyuki Adachi, Yokohama (JP); Tomohiro Yoneyama, Yokohama (JP); Koichi Miyazaki, Yokohama (JP)

(73) Assignee: KYOSAN ELECTRIC MFG. CO., LTD., Yokohama (JP)

( * ) Notice: Subject to any disclaimer, the term of this patent is extended or adjusted under 35 U.S.C. 154(b) by 343 days.

(21) Appl. No.: 17/602,021

(22) PCT Filed: Nov. 8, 2019

(86) PCT No.: PCT/JP2019/043860
§ 371 (c)(1),
(2) Date: Oct. 7, 2021

(87) PCT Pub. No.: WO2020/208851
PCT Pub. Date: Oct. 15, 2020

(65) Prior Publication Data
US 2022/0149719 A1 May 12, 2022

(30) Foreign Application Priority Data
Apr. 11, 2019 (JP) .................. 2019-075937

(51) Int. Cl.
*H02M 1/00* (2006.01)
*H02M 1/08* (2006.01)
(Continued)

(52) U.S. Cl.
CPC .............. *H02M 1/40* (2013.01); *H02M 1/08* (2013.01); *H02M 3/155* (2013.01)

(58) Field of Classification Search
CPC .............................. H02M 3/155; H02M 1/40
See application file for complete search history.

(56) References Cited

U.S. PATENT DOCUMENTS

| | | | |
|---|---|---|---|
| 6,191,960 B1 * | 2/2001 | Fraidlin | H02M 3/33576 363/90 |
| 6,239,993 B1 * | 5/2001 | Fraidlin | H02M 3/33571 363/56.03 |

(Continued)

FOREIGN PATENT DOCUMENTS

| | | |
|---|---|---|
| JP | 8-222258 A | 8/1996 |
| JP | 2004-23825 A | 1/2004 |

(Continued)

OTHER PUBLICATIONS

International Search Report dated Jan. 28, 2020, issued in counterpart International Application No. PCT/JP2019/043860 (2 pages).

(Continued)

*Primary Examiner* — Sisay G Tiku
(74) *Attorney, Agent, or Firm* — WHDA, LLP

(57) ABSTRACT

In the present invention, when a DC reactor is in a magnetically saturated state, the on/off operations of a switching element are suspended and the switching element is set to an off state for a predetermined period of time, thereby resetting the magnetic saturation of the DC reactor and maintaining the supply of power to a load. After resetting the magnetic saturation, the pulse output of the normal pulse mode is restarted.

8 Claims, 23 Drawing Sheets

(51) Int. Cl.
*H02M 1/40* (2007.01)
*H02M 3/155* (2006.01)

(56) References Cited

U.S. PATENT DOCUMENTS

| | | | |
|---|---|---|---|
| 6,259,235 B1 * | 7/2001 | Fraidlin | H02M 3/158 |
| | | | 323/290 |
| 2004/0004848 A1 * | 1/2004 | Yuzurihara | H02M 3/3376 |
| | | | 363/16 |
| 2015/0002128 A1 | 1/2015 | Cho | |
| 2018/0123440 A1 | 5/2018 | Lee et al. | |
| 2019/0165666 A1 | 5/2019 | Nishimoto et al. | |
| 2022/0094261 A1 * | 3/2022 | Yuzurihara | H02M 1/0064 |
| 2022/0094266 A1 * | 3/2022 | Yuzurihara | H02M 3/158 |
| 2022/0094269 A1 * | 3/2022 | Yuzurihara | H02M 1/007 |
| 2022/0200582 A1 * | 6/2022 | Yuzurihara | H02M 1/40 |
| 2022/0209651 A1 * | 6/2022 | Yuzurihara | H05H 1/36 |

FOREIGN PATENT DOCUMENTS

| | | |
|---|---|---|
| JP | 2006-6053 A | 1/2006 |
| JP | 5270399 B2 | 8/2013 |
| WO | 2018/021510 A1 | 2/2018 |

OTHER PUBLICATIONS

Zhao, "High-Efficiency, High Step-Up DC-DC Converters", IEEE Transaction on Power Electronics, 2003, vol. 18, No. 1, pp. 65-73, cited in EP Extended European Search Report dated May 4, 2023. (9 pages).

Extended (Supplementary) European Search Report dated May 4, 2023, issued in counterpart EP application No. 19924016.9. (7 pages).

* cited by examiner

FIG. 2(a) ON STATE
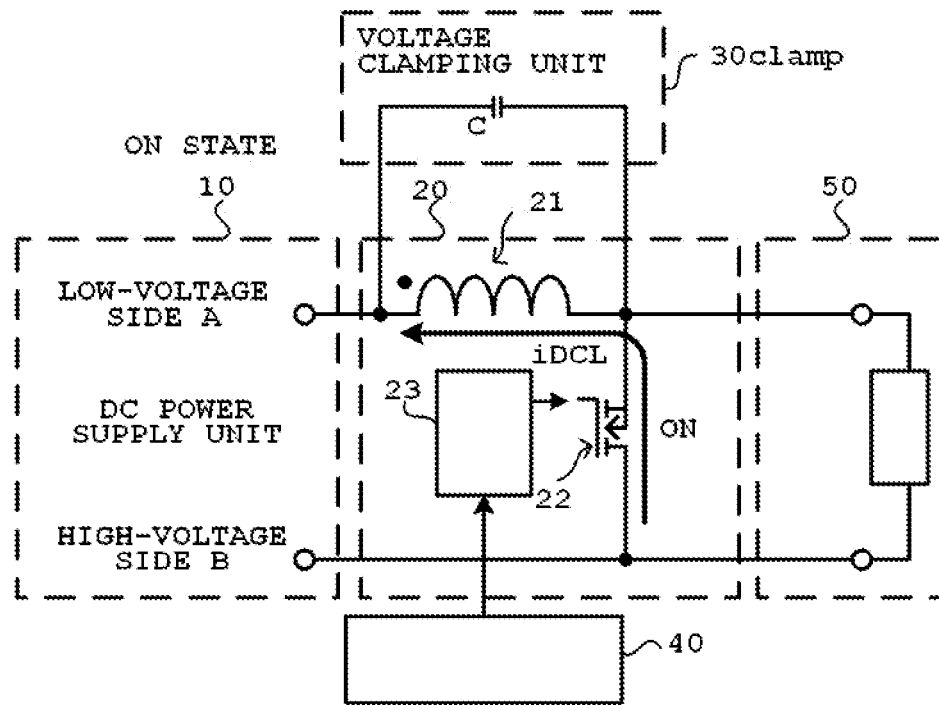
FIG. 2(b) OFF STATE (MAGNETIC SATURATION RESET)
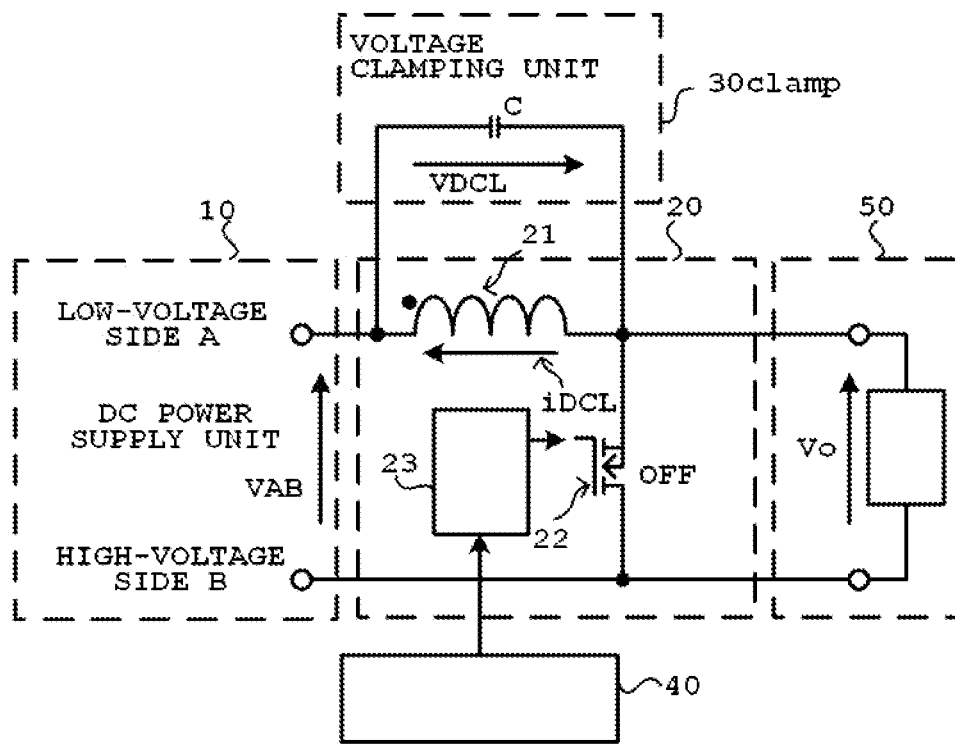

DC PULSE POWER SUPPLY DEVICE AND MAGNETIC SATURATION RESET METHOD FOR DC PULSE POWER SUPPLY DEVICE

TECHNICAL FIELD

The present invention relates to the technical field of preventing magnetic saturation of a DC reactor, more particularly to a DC power supply device for preventing the magnetic saturation of the DC reactor included in a chopper circuit and a method for resetting the magnetic saturation.

BACKGROUND ART

There is known circuitry of a DC pulse power supply device as pulse generation circuit for generating a pulse output, comprising a series circuit composes of a DC reactor and a switching element. The pulse generation circuit repeatedly performs an ON/OFF operation of the switching element to interrupt a DC voltage, thereby obtaining a DC voltage with a pulse waveform.

A pulse output from a DC pulse power supply device is a high-frequency output that continuously turns on and off a DC voltage in a range of several Hz to hundreds kHz.

The DC pulse power supply device is used for supplying the pulse output to a load of a plasma generation device, an exciting of a pulse laser, an electrical discharge machine or similar. In the case of using the DC power supply device as plasma generation device, the pulse output is supplied between electrodes in a plasma generating chamber, so as to ignite plasma generated by the electrical discharge occurring between the electrodes and keep the generated plasma.

FIG. 21(a) shows a configuration example of the DC pulse power supply device that comprises a pulse generation circuit having a chopper circuit. It is known that a DC pulse power supply device uses a step-up chopper circuit as a circuit for generating a pulse waveform. A DC pulse power supply device 100A consists of a DC power supply unit 110A and a pulsing unit 120A. A step-up copper circuit of the pulsing unit 120A is composed of a DC reactor 121A and a switching element 122A connected in series, in which the switching element 122A supplies a pulse output obtained by boosting a DC voltage in the DC power supply unit 110A to a load 150A according to an ON/OFF operation in response to a drive signal from a drive circuit 123A (see Patent Literatures 1 and 2).

CITATION LIST

Patent Literature

[Patent Literature 1] Japanese Patent Laid-Open Publication No. 222258/1996 (FIG. 1, Paragraph 0012)

[Patent Literature 2] Japanese Patent Laid-Open Publication No. 2006-6053 (FIG. 1)

SUMMARY OF THE INVENTION

Problems to be Solved by the Invention

In the chopper circuit of the pulsing unit 120A shown in FIG. 21(a), a DS voltage between a drain D and a source S of the switching element 122A is boosted by a surge voltage generated by a leakage inductance included in the DC reactor 121A during an OFF state of the switching element 122A. The inventors of the present application suggest a configuration for preventing the switching element 122A from being damaged by the surge voltage, in which configuration a voltage clamping unit 130 clamp is provided to clamp a voltage across a DC reactor 121B to a predetermined voltage. FIG. 21(b) shows a schematic view of suggested circuitry. A voltage clamping unit 130clampB has a capacitor C connected in parallel to the DC reactor 121B. The voltage clamping unit 130clampB clamps a voltage VC in the capacitor C to a voltage lower than the surge voltage to thereby suppressing an excessive rise in a DC voltage.

When an arc is generated during supplying electric power to a plasma load, the DC pulse power supply device changes from a pulse mode in which a pulse output is generated in a normal state to an arc mode, so as to maintain plasma while eliminating the generation of arc. In the arc mode, an ON/OFF cycle of a switching element 122B and/or a time width during the ON period are changed to reduce the electric power to be supplied to the plasma load, in order to maintain the plasma while eliminating the arc generation. In the arc mode, a voltage to be applied to the DC reactor 121B has different directions of polarity of voltage application in the ON period and the OFF period.

In general, permeability of a reactor decreases as a magnetic field increases due to an increase in a current, and when a magnetic flux density of a magnetic material reaches its peak, the reactor reaches a magnetic saturation state. Low permeability in the state of magnetic saturation causes overcurrent. The magnetic saturation of the reactor is reset when a voltage with opposite polarity applied to the reactor, a voltage-time product (ET product), which is a product of voltage and time, is equal.

In the arc mode, the voltage-time products of the application time in the ON period and the OFF period become equal, where the polarity of the switching element 122B is different in each period, so that the magnetic saturation of the DC reactor 121B is reset.

However, in the circuitry that includes the voltage clamping unit, a problem arises that the reset of the magnetic saturation of the DC reactor is not performed sufficiently. FIG. 21(d) shows a state in which the magnetic saturation is occurring. A voltage in an OFF period (T−Tw) of the switching element 122B is suppressed by a voltage VC which is clamped by the capacitor C of the voltage clamping unit 130clampB. Thus, since a voltage-time product Soff when the switching element 122B is in the OFF period is smaller than a voltage-time product Son when the switching element 122B is in the ON period (Tw), the DC reactor reaches the magnetic saturation point without magnetic deviation being reset. In order to reset the magnetic saturation, it is necessary to increase the time width in the OFF period. However, the time width in the ON period (Tw) in the arc mode is usually fixed in advance, so that it occurs repeatedly. Accordingly, the OFF period (T−Tw) is very short, and it is difficult to define the OFF period to be adequately long for resetting the magnetic saturation.

As an example of eliminating the magnetic saturation, a configuration for stopping the DC power supply unit during the state of the magnetic saturation can be considered. FIG. 21(c) shows a configuration example of stopping a DC power supply unit 110C. In this configuration example, a control circuit unit 140C sends out a stop command signal to the DC power supply unit 110C during the state of the magnetic saturation, thereby stopping an output operation of the DC power supply unit 110C. The DC power supply unit 110C stops power supply to a pulsing unit 120C and a load 150C upon detection of the stop command signal. Since the power supply from the DC power supply unit 110C is stopped, the pulsing unit 120C resets the magnetic saturation of a DC reactor 121C. After the DC reactor 121C is reset, the control circuit unit 140C sends a reboot command to the DC power supply unit 110C so as to reboot the DC power supply unit 110C.

In the configuration example shown in FIG. 21(c), during the pulse mode of the DC pulse power supply device 100C in which the pulse is continuously output, the control circuit unit 140C performs the control in the arc mode by interrupt processing when an arc detecting unit 160C detects the generation of an arc in a plasma generation device of a load 150C. In the arc mode, the control circuit unit 140C varies an ON/OFF cycle and/or a time width of an ON period upon detection of the arc, thereby controlling the power supply from the DC power supply unit 110C to the load 150C.

FIGS. 22 and 23 are a flowchart and a waveform chart, respectively, which illustrate an operation for resetting the magnetic saturation in the DC pulse power supply device 100C by stopping the DC power supply unit 110C.

When the generation of the arc is detected during the operation in the pulse mode for supplying steady power to the plasma load, the DC pulse power supply device carries out the interrupt processing to control the arc mode. When the generation of the arc in the plasma load 150C is detected by the arc detecting unit 160C (S121), the control circuit unit 140C activates the switching element 122C in the arc mode in response to the generation of the arc (S122).

The arc mode is for changing the pulse period and/or for varying a time width Tw among a time width T of the pulse period during which the switching element is in the ON state. In the time width Tw of the time width T in the pulse period, the switching element 122C is in the ON state, so that the power supply to the load 150C is stopped. In a time width (T−Tw) until the start of the next pulse period, the switching element is in the OFF state to supply the power to the load 150C. In which case, the time width Tw is set to be shorter than the time width of the pulse period in the ON/OFF operation of the switching element. When the switching element 122C is in the period of the ON state, the DC power supply unit 110C applies an ON-resistance voltage in the switching element 122C to the load 150C. However, as the ON-resistance voltage is close to a ground voltage, the power supply to the load is carried out mainly in the time width (T−Tw) in the OFF period. In this way, the control of the power supply to the load can eliminate the generation of the arc.

In the arc mode, a DC reactor current iDCL flows through the DC reactor 121C, and a current value of the DC reactor current iDCL gradually increases during the time width Tw and decreases during the time width (T−Tw). Since the time width (T−Tw) is shorter than the time width Tw, the decrement of the DC reactor current is little.

In the arc mode, for avoiding an excessive rise in a voltage caused by a surge voltage, a configuration, in which a voltage clamping unit 130clampC suppresses a voltage in the DC reactor, applies a voltage with opposite polarity in the time width Tw in the ON period and the time width (T−Tw) in the OFF period. At this time, the voltage applied in the OFF period is clamped, so that the voltage-time product Soff in the OFF period becomes smaller than the voltage-time product Son in the ON period, and thereby the magnetic deviation occurs and the DC reactor 121C is magnetically saturated after repeating the ON/OFF operation several times.

During arc generation, while the DC reactor goes from the magnetically deviated state into the magnetically saturated state by the switching element in the ON state, the current value of the DC reactor current iDCL gradually increases, and thus the DC reactor 121C reaches a saturated current level iSA where the DC reactor 121C is magnetically saturated. When the DC reactor 121C reaches magnetic saturation, the inductance function of the reactor is reduced, so that an excessive current is generated that causes the damage to the switching element.

When the generation of an arc is detected (S121) during the operation in the pulse mode (S111), the control circuit unit 140C performs the interrupt processing in the arc mode (S122) to eliminate the generation of the arc while performing a reset processing of magnetic saturation (S112).

In the reset processing (S112), upon the detection of the magnetic saturation (S112a), the DC power supply unit 110C is stopped (S112b). The stop of the DC power supply unit 110C continues until a stop time Tstop reaches a set time TST (S113a).

In general, a snubber circuit is connected in parallel to the switching element for performing ON/OFF operation on the DC reactor for preventing damage to the element due to the excessive current. In FIGS. 21(a) to 21(d) the snubber circuit is not shown. In FIG. 21(c), when the power supply of the DC power supply unit 110C is stopped, the DC reactor current iDCL gradually decreases due to a discharge current or similar in a capacitor of the snubber circuit, resulting in the decrease in the voltage in the DC reactor. As a consequence, the voltage-time product with the polarity corresponding to the ON period of the switching element is reduced and thus a difference is reduced between the concerned voltage-time product and the voltage-time product with the polarity corresponding to the OFF period of the switching element, thereby resetting the magnetic saturation of the DC reactor 121C. The reset of the magnetic saturation of the DC reactor 121C can be determined based on whether or not the set time TST predetermined in the stop time Tstop of the DC power supply unit 110C has exceeded. In this case, the set time TST is defined to a time length sufficient to reset the magnetic saturation of the DC reactor 121C.

When it is determined that the magnetic saturation has been reset, the control circuit unit 140C outputs a reboot command to reboot the DC power supply unit 110C, thereby resuming the power supply to the pulsing unit 120C (S113b) and in turn performing the control in the pulse mode (S114).

However, in the configuration in which the magnetic saturation is reset by stopping the DC power supply unit, the power supply to the load is stopped due to stopping of the DC power supply unit. When the power supply is stopped, it is necessary to reboot a device on the load side, which causes a problem that a time for reboot is required. For example, a plasma load in the plasma generation device or others needs to be rebooted in order to regenerate the plasma after the stop of plasma discharge. The time for reboot is a factor that reduces the efficiency of plasma processing. If the generation of arc is repeated, the time for reboot is required each time of reboot, and thus the decrease of the efficiency in plasma processing is a major factor of the decrease in the operating rate of the device.

An object of the present invention is to solve the above-mentioned conventional problems and to reset the magnetic saturation of the DC reactor in the DC pulse power supply device. In addition to that, another object of the invention is to continue supplying the electric power to the load when the magnetic saturation is reset.

Means for Solving the Problem

The present invention resets the magnetic saturation of the DC reactor and maintains power supply to the load by suspending the ON/OFF operation of the switching element for a predetermined time to turn it off when the DC reactor reaches the state of magnetic saturation. After the magnetic saturation is reset, the pulse output in the normal pulse mode is restarted. Even if the voltage is clamped by the voltage clamping unit, the voltage-time product of opposite polarity is canceled and the magnetically saturated DC reactor is reset by turning the switching element into the OFF state during a suspension time having the length appropriate to the voltage-time product in the ON period. At this time, the magnetic permeability of the DC reactor increases along with the elimination of the magnetic deviation of the DC reactor and the reset of the magnetic saturation, and the current value of the DC reactor current iDCL is reduced.

On the other hand, although the generation of the pulse output is suspended because of the switching element is in the OFF state during the suspension time, since the DC power supply is connected to the load via the DC reactor, the DC voltage is applied to the load to thereby maintain the power supply.

When the magnetic saturation is reset by stopping the power supply to the load, problems arise regarding the reboot of the device on the load side and its reboot time. By contrast, since the power supply to the load is maintained according to the magnetic saturation by suspending the switching element of the present invention, the problems such as the reboot of the device on the load side and its restart time can be solved.

The present invention has embodiments of a DC pulse power supply device and a method for controlling the DC pulse power supply device.

(DC Pulse Power Supply Device)

The DC pulse power supply device according to the present invention comprises:

(a) a DC power supply unit;

(b) a pulsing unit having a series circuit consisting of a DC reactor and a switching element to generate a pulse output from a DC voltage in the DC power supply unit;

(c) a voltage clamping unit having a capacitor connected in parallel to the DC reactor of the pulsing unit to restrict a voltage across the DC reactor to a clamp voltage by a capacitor voltage of the capacitor; and (d) a control circuit unit for controlling an ON/OFF operation of the switching element of the pulsing unit.

The control circuit unit comprises:

(d1) a switching cycle control unit for controlling a cycle of a switching operation of the switching element; and (d2) a suspension/restart control unit for controlling the suspension and restart of the switching operation of the switching element.

(d1: Switching Cycle Control unit)

The switching cycle control unit has two operation modes, i.e. arc mode and pulse mode, which have different pulse cycles and/or pulse widths depending on a state of an arc.

(1) Arc Mode

The arc mode is a first cycle mode in which the power supply to a load is stopped to suppress the generation of the arc in the arc generation state, and the current value of a DC reactor current increases toward the saturation current level along with magnetic deviation of the DC reactor.

(2) Pulse Mode

The pulse mode is a second cycle mode of a predetermined cycle for constantly supplying the electric power to the load in a state of normal plasma drive, and the fluctuation of the current value of the DC reactor current falls within a level range which is equal or lower than the saturation current level.

The pulse mode has a suspension time for suspending the switching operation of the switching element during the mode operation, and resets the magnetic saturation of the DC reactor during the suspension time with the power supply to the load being maintained by the suspension/restart control unit.

(d2: Suspension/Restart Control Unit)

The suspension/restart control unit performs (a) suspension control for bringing the switching element into an OFF state to suspend the switching operation at the time that the DC reactor reaches the magnetic saturation.

The switching element goes into the OFF state in the suspension state, in which case a voltage-time product of the DC reactor is a product of a clamped capacitor voltage and a suspension time. The voltage-time product in the suspension state can be equal to a voltage-time product in a state where the switching element is ON state by taking a sufficient suspension time, and thereby the magnetic saturation is reset. A DC reactor voltage is a voltage generated by energy accumulated in the DC reactor, and a time width of the suspension time is sufficiently long such that a voltage-time product of the reactor voltage and a clamp voltage corresponds to the voltage-time product when the switching element is in the ON state. Since the switching element is in the OFF state in the suspension control, the application of a DC voltage from the DC power supply to the load is maintained.

(b) At the time that the magnetic saturation of the DC reactor is reset, the restart control is performed to restart a driving operation of the switching element.

The suspension control and the restart control by the suspension/restart control unit have a control aspect based on a time and a control aspect based on a current, respectively.

(a) Suspension Control (a1) The suspension control according to the control aspect based on the time suspends the switching element when the accumulated time width is beyond the set time width, based on a comparison an accumulated time width for suspending the switching operation in several pulsing operations with a set time width corresponding to a saturation level of magnetic saturation.

(a2) The suspension control according to the control aspect based on the current suspends the switching element when the current value of the DC reactor current is beyond the set current value, based on a comparison the current value of the DC reactor current that is increased by the several pulsing operations with a set current value corresponding to the saturation level of the magnetic saturation.

(b) Restart Control (b1) The restart control according to the control aspect based on the time restarts the operation of the switching element in the pulse mode when the suspension time reaches the set time width, based on a comparison the suspension time in the suspension control with a set time width in which the magnetic saturation is reset.

(b2) The restart control according to the control aspect based on the current restarts the operation of the switching element in the pulse mode when the current value of the DC reactor current is reduced to the current value in the pulse mode, based on a comparison the current value of the DC reactor current that is decreased by the suspension control with a current value of the DC reactor current when the magnetic saturation is reset and the pulse mode is performed.

The suspension control and the restart control have a first aspect in which time regulation is performed to regulate both of the suspension control and the restart control based on a time, a second aspect in which current regulation is performed to regulate both of control based on a current, a third aspect of regulating the suspension control based on the time while regulating the restart control based on the current, and a fourth aspect of regulating the suspension control based on the current while regulating the restart control based on the time. It is to be noted that the above-mentioned time regulation means a control aspect that controls the switching element based on an elapsed time, but the time itself is not a control target. Furthermore, the current regulation means a control aspect that controls the switching element based on the current value, but the current itself is not a control target.

First Aspect

The first aspect is for performing the time regulation for the suspension control and the restart control based on the time.

In the first aspect, the suspension/restart control unit suspends the operation of the switching element at the time that an accumulated pulse width (Tpulse) obtained by accumulating a time width (Ton) in the ON state in every ON/OFF operation of the switching element in the arc mode exceeds an allowable time width (TP) of the magnetic saturation, while restarting the operation of the switching element at the time that a suspension time (Trest) of the switching element exceeds a set time (TRE).

Second Aspect

The second aspect is for performing the current regulation for the suspension control and the restart control based on the current.

In the second aspect, the suspension/restart control unit suspends the operation of the switching element at the time that an increase in a DC reactor current (iDCL) of the switching element exceeds a magnetic saturation level (iSA) of the DC reactor current in the arc mode, while restarting the operation of the switching element at the time that the DC reactor current (iDCL) of the switching element exceeds a pulse mode level (iPA) of the DC reactor current in the pulse mode.

Third Aspect

The third aspect is for performing the time control on the basis of the time for the suspension control and the current control on the basis of the current for the restart control. In the third aspect, the suspension/restart control unit suspends the operation of the switching element at the time that the accumulated pulse width (Tpulse) obtained by accumulating a time width (Ton) in the ON state in the ON/OFF operation of the switching element in the arc mode exceeds the allowable time width (TP) of the magnetic saturation, while restarting the operation of the switching element at the time that the DC reactor current (iDCL) of the switching element exceeds the pulse mode level (iPA) of the DC reactor current in the pulse mode.

Fourth Aspect

The fourth aspect is for performing the current control on the basis of the current for the suspension control and the time control on the basis of the time for the restart control. The suspension/restart control unit suspends the operation of the switching element at the time that the DC reactor current (iDCL) of the switching element in the arc mode exceeds the magnetic saturation level (iSA) of the DC reactor current, while restarting the operation of the switching element at the time that the suspension time (Trest) of the switching element exceeds the set time (TRE).

For the suspension control and the restart control, any of the first to fourth aspects may be applied in terms of a combination of the time control based on the time and the current control based on the current.

(Voltage Clamping Unit)

The voltage clamping unit may be configured by using the regeneration circuit that regenerates a voltage exceeding the clamp voltage in the capacitor voltage to the DC power supply unit, or may be adopted the configurations using another commonly known clamp circuit. In the case where the regeneration circuit is used as the voltage clamping unit, the capacitor voltage determined by the transformer ratio of the transformer provided between the DC power supply unit and the regeneration circuit becomes the clamp voltage, and the voltage exceeding the clamp voltage is regenerated to the DC power supply unit.

(Controlling Method for DC Pulse Power Supply Device)

A controlling method for the DC pulse power supply device of the present invention is for controlling the DC pulse power supply device comprising a DC power supply unit, a pulsing unit comprising a series circuit consisting of a switching element and a DC reactor for generating a pulse output using a DC voltage in the DC power supply unit, a voltage clamping unit for suppressing a voltage across the DC reactor to the clamp voltage by using a capacitor voltage in a capacitor connected in parallel to the DC reactor of the pulsing unit, and a control circuit unit for controlling an ON/OFF operation of the switching element of the pulsing unit.

The control carried out by the control circuit unit includes (d1) switching cycle control that controls a cycle of a switching operation of the switching element, and (d2) suspension/restart control that controls suspension and restart of the switching operation of the switching element.

(d1: Switching Cycle Control)

The switching cycle control has two operation modes, namely an arc mode and a pulse mode, in which a pulse cycles and/or pulse widths is different according to a state of an arc.

(1) Arc Mode

The arc mode is a first cycle mode in which the power supply to a load is stopped to suppress the generation of the arc in the arc generation state, and the current value of the DC reactor current increases toward the saturation current level along with magnetic deviation of the DC reactor.

(2) Pulse Mode

The pulse mode is a second cycle mode of a predetermined cycle for constantly supplying the electric power to the load in a state of normal plasma drive, and the fluctuation of the current value of the DC reactor current falls within a level range which is equal or lower than the saturation current level.

The pulse mode has a suspension time for suspending the switching operation of the switching element during the mode operation, and resets the magnetic saturation of the DC reactor during the suspension time with the power supply to the load being maintained by the suspension/restart control unit.

(d2: Suspension/Restart Control)

The suspension/restart control performs (a) the suspension control for bringing the switching element into an OFF state to suspend the switching operation at the time that the DC reactor reaches the magnetic saturation.

The switching element goes into the OFF state in the suspension state, in which case a voltage-time product of the DC reactor is a product of a clamped capacitor voltage and the suspension time. The voltage-time product in the suspension state can be equal to the voltage-time product in a state where the switching element is ON state by taking a sufficient suspension time, and thereby the magnetic saturation is reset. The DC reactor voltage is a voltage generated by the energy accumulated in the DC reactor, and a time width of the suspension time is sufficiently long such that the voltage-time product of the reactor voltage and the clamp voltage corresponds to the voltage-time product when the switching element is in the ON state. Since the switching element is in the OFF state in the suspension control, the application of the DC voltage from the DC power supply to the load is maintained.

(b) The restart control is performed for restarting the driving operation of the switching element at the time that the magnetic saturation of the DC reactor is reset.

The suspension control and the restart control are performed by the control on the basis of the time and the control on the basis of the current, respectively.

(a) Suspension Control (a1) The suspension control according to the control aspect based on the time suspends the switching element when the accumulated time width exceeds the set time width, based on a comparison an accumulated time width for suspending the switching operation in several pulsing operations with a set time width corresponding to a saturation level of magnetic saturation.

(a2) The suspension control according to the control aspect based on the current suspends the switching element when the current value of the DC reactor current exceeds the set current value, based on a comparison the current value of the DC reactor current that is increased by the several pulsing operations with a set current value corresponding to the saturation level of the magnetic saturation.

(b) Restart Control (b1) The restart control according to the control aspect based on the time restarts the operation of the switching element in the pulse mode when the suspension time reaches the set time width, based on a comparison the suspension time in the suspension control with a set time width in which the magnetic saturation is reset.

(b2) The restart control according to the control aspect based on the time restarts the operation of the switching element in the pulse mode when the current value of the DC reactor current is reduced to a current value in the pulse mode, based on a comparison the current value of the DC reactor current that is decreased by the suspension control with a current value of the DC reactor current when the magnetic saturation is reset and the pulse mode is performed.

The suspension control and the restart control by the suspension/restart control unit perform the control based on the time and the control based on the current, respectively. The control has four aspects, that is, the first aspect in which the time regulation is performed to regulate both of the suspension control and restart control based on the time, the second aspect in which the current regulation is performed to regulate both controls based on the current, the third aspect that performs the suspension control based on the time and the restart control based on the current, and the fourth aspect that performs the suspension control based on the current and the restart control based on the time.

Effects of the Invention

As described above, in accordance with the present invention, the DC pulse power supply device can reset the magnetic saturation of the DC reactor, and retain the power supply to the load at the time of resetting the magnetic saturation.

BRIEF DESCRIPTION OF THE DRAWINGS

FIGS. 2(a) and 2(b) illustrate an operation of the DC power supply device according to the invention;

BEST MODE FOR CARRYING OUT THE INVENTION

A DC pulse power supply of the present invention suspends a switching operation of a pulsing unit for a predetermined period when a DC reactor provided in the pulsing unit reaches a state of magnetic saturation and stops the generation of a pulse output, thereby reducing a DC voltage in the DC reactor to reset the magnetic saturation of the DC reactor. Even during a suspension time for resetting the magnetic saturation, a DC current flows from a DC power supply unit to a load via the DC reactor, so that the power supply to the load is maintained and a loss of plasma in a plasma load can be avoided.

Figure 14A:
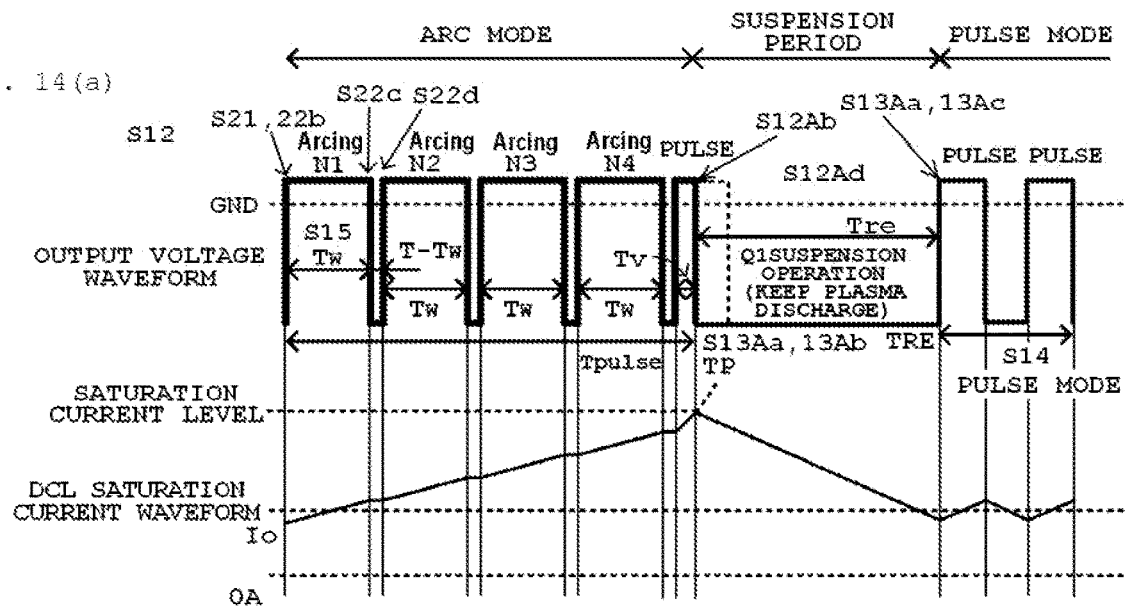
FIGS. 14(a) and 14(b) show waveform charts of the suspension control and the restart control according to the DC pulse power supply of the invention.
Figure 14B:
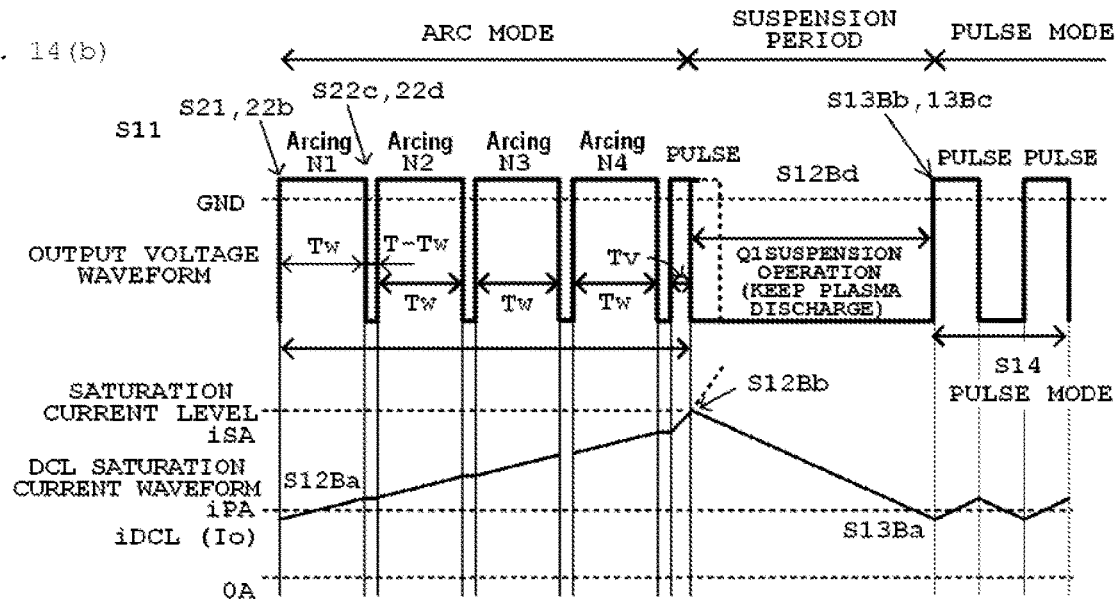

A schematic configuration and an operation of the DC power supply device of the will be described with reference to FIGS. 1 to 2(*b*), and an operation of magnetic saturation reset of the DC pulse power supply of the invention will be described with reference to flowcharts in FIGS. 3(*a*) to 11. In these figures, FIGS. 4(*a*) to 6(*b*) are flowcharts illustrating schematic operations of suspension control and restart control for the magnetic saturation reset, and FIGS. 7 to 11 are flowcharts illustrating schematic operations of suspension control, restart control, and interrupt processing with an arc mode for the magnetic saturation reset when the DC power supply device supplies electric power to the plasma load. FIGS. 12(*a*) to 13(*b*) are block diagrams illustrating aspects of the suspension control and the restart control in the schematic configuration of the DC power supply device to be applied to the plasma load. FIGS. 14(*a*) and 14(*b*) show waveform charts of the suspension control and the restart control, in which FIG. 14(*a*) is a waveform chart of time regulation that is based on a time, and FIG. 14(*b*) is a waveform chart of current regulation that is based on a current.

FIGS. 15, 17 to 20 illustrate first to fifth configuration examples for the DC pulse power supply of the invention, each configuration comprising a regeneration unit as voltage clamping unit. FIG. 16 is a schematic block diagram of the regeneration unit.

(Schematic Configuration of DC Pulse Power Supply Device)

Figure 1:
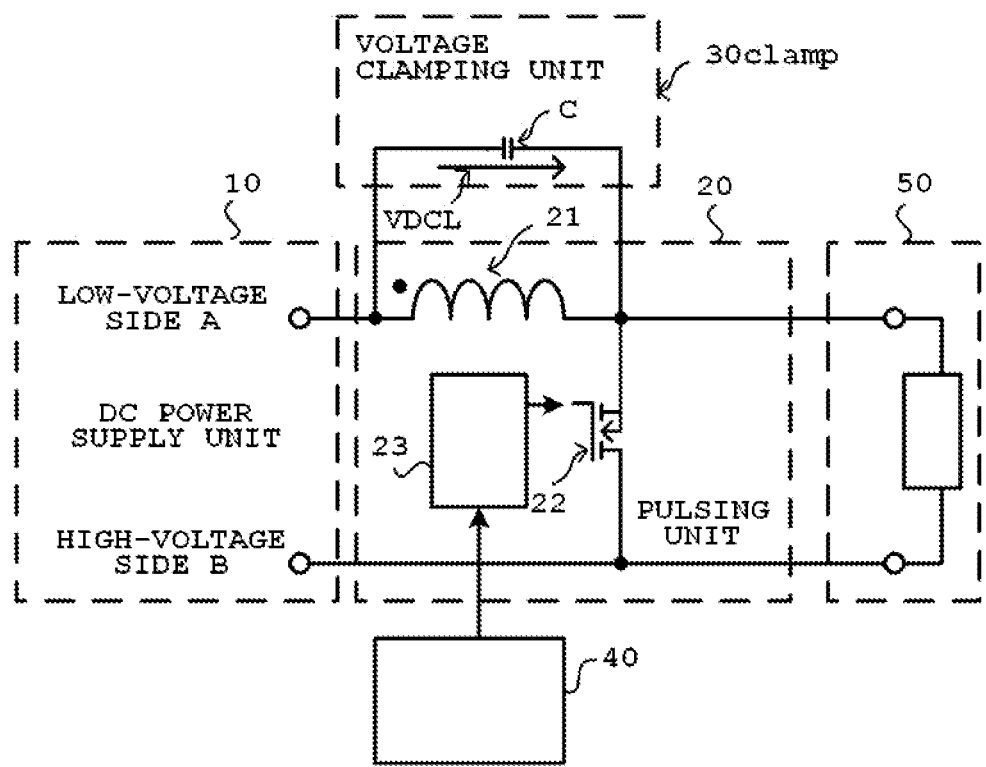
FIG. 1 illustrates a schematic configuration of a DC power supply device according to the invention.

FIG. 1 shows a schematic configuration of the DC pulse power supply device of the present invention. The DC pulse power supply device comprises a DC power supply unit 10, a pulsing unit 20, a voltage clamping unit 30 clamp and a control circuit unit 40, the pulsing unit 20 creating a pulse output from a DC voltage in the DC power supply unit 10 to supply the pulse output to a load 50.

The pulsing unit 20 is configured to generate a pulse output by using a step-up chopper circuit. The pulsing unit 20 is composed of a step-up chopper circuit that comprises a DC circuit consisting of a DC reactor 21 and a switching element 22, in which the DC reactor 21 is connected in series between the DC power supply unit 10 and the load 50, and the switching element 22 is connected in parallel to the load 50. In addition to that, a drive circuit 23 is also provided to actuate an ON/OFF operation of the switching element 22 to generate a pulse waveform from a DC voltage. A capacitor C is connected in parallel to the DC reactor 21. The capacitor C is one of constituent elements of the voltage clamping unit 30clamp that clamps a voltage of a clamp voltage to a predetermined voltage to prevent a voltage across the DC reactor 21 from exceeding the predetermined voltage of the capacitor voltage.

In the illustrative configuration example, the pulsing unit 20 is provided on the DC power supply side with a terminal B which is grounded and a terminal A for a negative voltage as low-voltage side. The switching element 22 is an example of FET, in which a source S is connected to the low-voltage side and a drain D is connected to a grounded voltage side, and a drive signal from the drive circuit 23 is input to a gate G.

The control circuit unit 40 controls the step-up chopper circuit via the drive circuit 23 in order to generate a control signal for setting a time width or a duty ratio between an ON time and an OFF time of the switching element 22 which corresponds to a desired pulse output. The drive circuit 23 outputs the drive signal to the gate G of the switching element 22 based on the control signal from the control circuit unit 40 so as to actuate the ON/OFF operation of the switching element 22.

The source S of the switching element 22 is connected to the load side of the DC reactor 21, and the drain D of the switching element 22 is grounded. When the switching element 22 is in an ON state, the load side of the DC reactor 21 is grounded, so that a DC reactor current iDCL flows from the terminal B to the terminal A through the switching element 22 in the ON state and the DC reactor 21. At this time, electromagnetic energy is accumulated in the DC reactor 21. Then, when the switching element 22 turns from the ON state to an OFF state, the energy accumulated in the DC reactor 21 generates a DC reactor voltage VDCL in the DC reactor 21. The step-up chopper circuit repeats the ON and OFF operations of the switching element 22 to boost an output voltage Vo according to the duty ratio of the ON/OFF times.

In driving the step-up chopper circuit, an upper limit component of the DC reactor voltage VDCL of the DC reactor 21 is clamped to a capacitor voltage VC of the capacitor C of the voltage clamping unit 30clamp connected in parallel. With the ON/OFF operation of the switching element 22, the voltage of the DC power supply is applied to the DC reactor 21 during an ON period, and the capacitor voltage VC of the capacitor C is applied during an OFF period, so that the voltage-time products with opposite polarities is obtained. Since the capacitor voltage VC is clamped to a voltage by the voltage clamping unit 30clamp, a difference between two voltage-time products causes magnetic deviation, and thus repetition of ON/OFF cycles leads to magnetic saturation. The magnetic deviation increase and the magnetic saturation cause the decrease in permeability of an inductance of the DC reactor 21 while increasing the DC reactor current iDCL. When the DC reactor 21 is magnetically saturated, the control circuit unit 40 controls the switching operation by the drive circuit 23 to reset the magnetic saturation of the DC reactor 21.

FIGS. 2(*a*) and 2(*b*) illustrate an operation of magnetic saturation reset by the control circuit unit 40, in which FIG. 2(*a*) shows a state that the DC reactor 21 reaches the magnetic saturation, and FIG. 2(*b*) shows a state that the magnetic saturation of the DC reactor 21 is reset.

When the step-up chopper circuit of the pulsing unit 20 performs the normal operation to generate the pulse output, the switching element 22 repeats ON/OFF operation to generate the pulse output from the DC voltage by the control of the drive circuit 23, as shown in FIG. 2(*a*). In this repetitive operation, the DC reactor current iDCL flows through the DC reactor 21 when the switching element 22 is in the ON state. In FIG. 2(*a*), the DC reactor current iDCL flows from a high-voltage side B toward a low-voltage side A.

When an abnormality occurs in the load 50, e.g. when the plasma is arc state, the control circuit unit 40 controls the drive circuit 23, changes the cycle for driving the switching element 22 to increase a time width of the ON state of the switching element 22, and limits the power supply to the load. When the time width of the ON state of the switching element 22 increases and the time width of the OFF state decreases, a voltage of a DC reset in the OFF state is clamped to the capacitor voltage VC of the voltage clamping unit 30clamp. Therefore, this causes a difference in the voltage-time products of the ON state and the OFF state, and the DC reactor 21 is magnetically deviated and reaches the magnetic saturation after being operated several cycles, and thereby the DC reactor current iDCL increases. The capacitor C connected in parallel to the DC reactor 21 is charged by the energy accumulated in the DC reactor 21 when the switching element 22 is in the OFF state.

When the DC reactor 21 reaches the magnetic saturation, the control circuit unit 40 controls the drive circuit 23 to bring the switching element 22 into the OFF state for a predetermined time, so as to put the operation of the pulsing unit 20 into suspension state. In this suspension state, the DC reactor 21 is applied with the capacitor voltage VC of the capacitor C with the opposite polarity to that of the voltage in the ON state of the switching element. The voltage with the opposite polarity is applied during the suspension time. Although the capacitor voltage VC has its upper limit clamped to the set voltage by the voltage clamping unit 30clamp, the length of the suspension time is set to be sufficiently long for obtaining a voltage-time product equal to the voltage-time product in the ON state, so that the magnetic saturation of the DC reactor 21 can be reset. The reset of the magnetic saturation increases the permeability of the DC reactor 21 while reducing the DC reactor current.

(Flow of Magnetic Saturation Reset)

The outline of the flow of the magnetic saturation reset according to the invention will be described with reference to a flowchart in FIGS. 3(*a*) and 3(*b*). The DC pulse power supply device generates the pulse output in a pulse mode (S1) to supply the electric power to the plasma load and to maintain the plasma. When an abnormality of the arc occurs in the plasma load, interrupt processing is performed to turn into an arc mode, the power supply to the load is suppressed to by controlling the cycle of the operation of the switch element, and the arc generation is eliminated. In the configuration where the voltage clamping unit suppresses an excessive voltage generated in the DC reactor, the voltage suppression by the voltage clamp causes the magnetic saturation of the DC reactor in the arc mode.

When the magnetic saturation is detected in the arc mode (S2), the suspension control is performed to suspend the switching operation during the pulse mode to reset the magnetic saturation, and after the reset of the magnetic saturation, the restart control is performed to restart the switching operation (S3), so as to supply the power with the pulse output (S4).

Figure 3A:
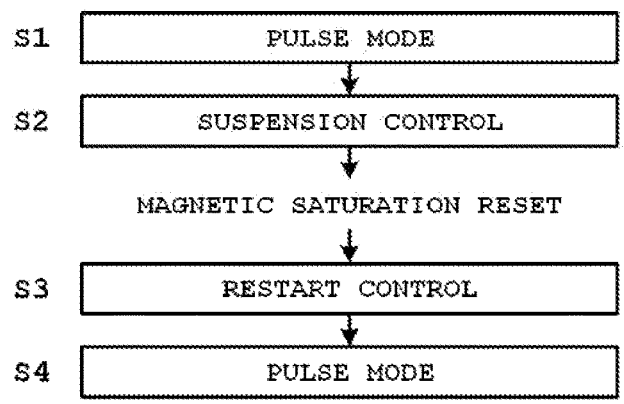
FIGS. 3(a) and 3(b) illustrate the configuration and the operation of the DC power supply device according to the invention.
Figure 3B:
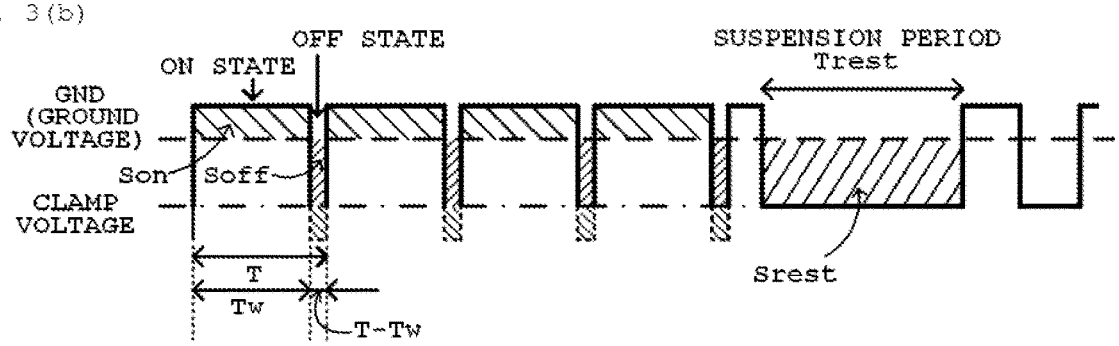
Figure 4A:
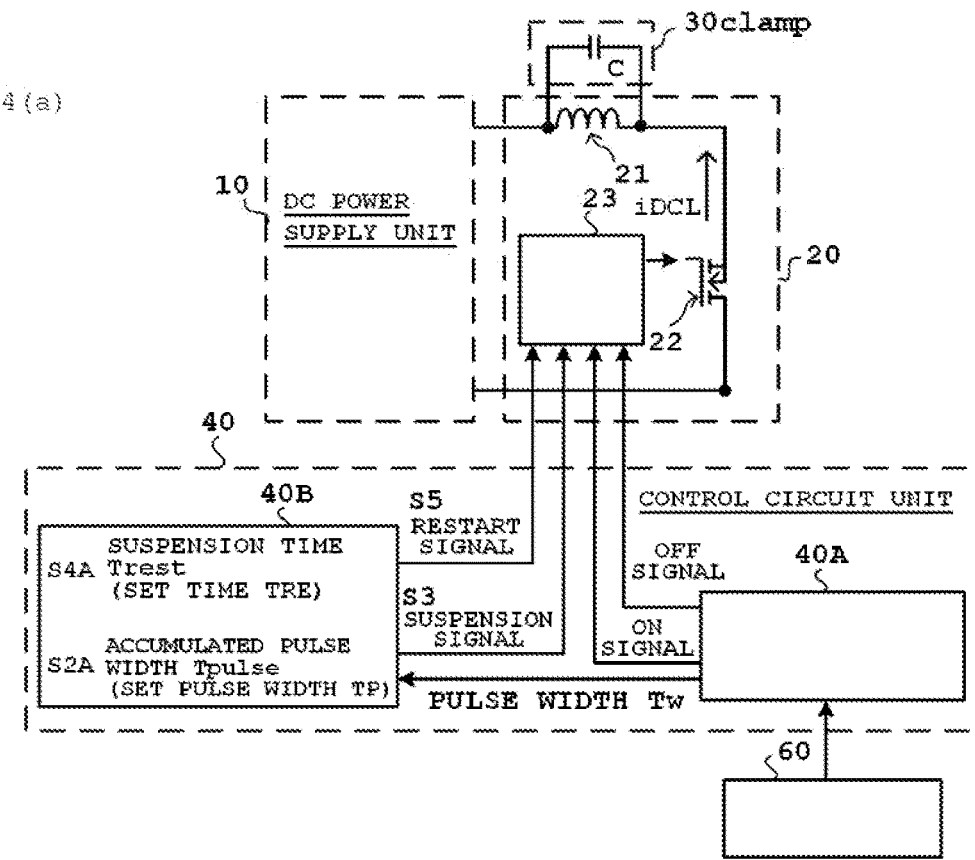
FIGS. 4(a) and 4(b) are a flowchart illustrating a schematic operation of magnetic saturation reset by the DC power supply device according to the invention.
Figure 4B:
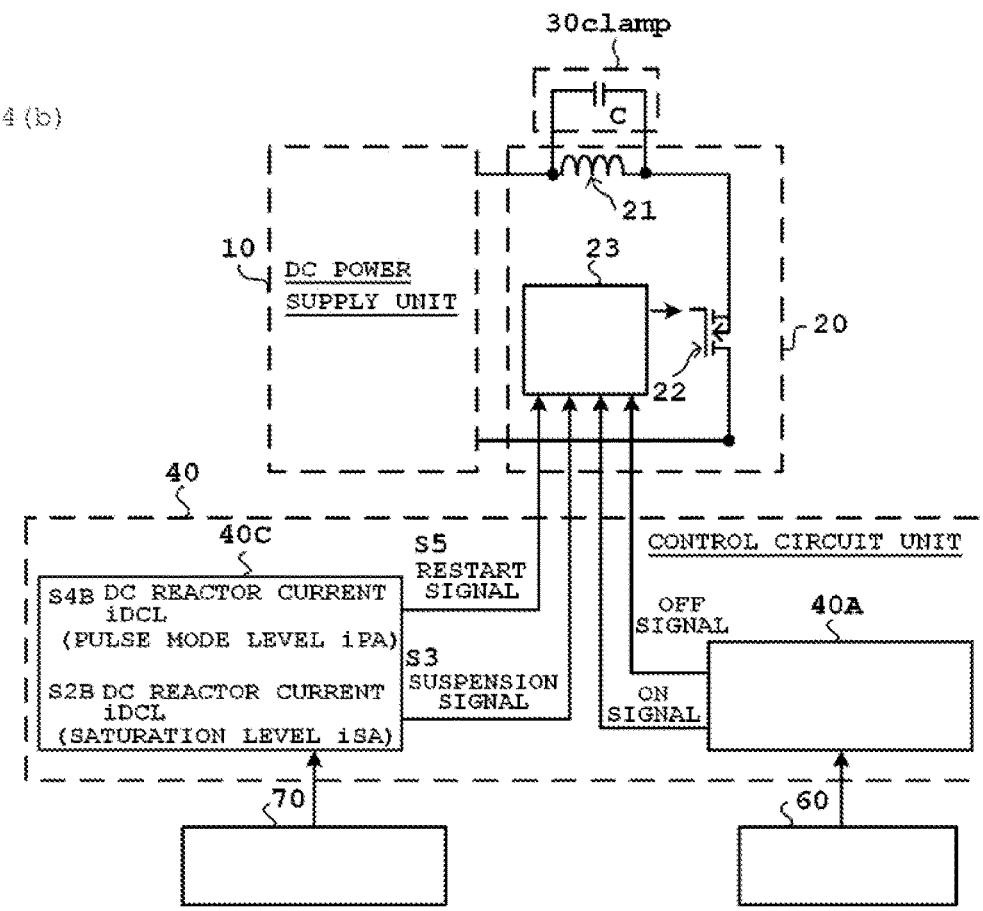

FIG. 3(*b*) illustrates an outline of the magnetic saturation reset. As shown in FIG. 21(*d*), the voltage during the OFF period (T−Tw) of the switching element is suppressed to the clamp voltage by the voltage clamping unit. Thus, a voltage-time product Soff in the OFF period (Tw) of the switching element becomes smaller than a voltage-time product Son in the ON state of the switching element, causing the magnetic deviation in the DC reactor that leads to the magnetic saturation.

After the magnetic saturation occurs, the suspension control is performed to suspend the switching operation, and the switching element is turned into the OFF state. In the suspension control, a voltage-time product Srest of the DC reactor is a product of the clamp voltage and a suspension time Trest. Although the DC reactor voltage is clamped to the clamp voltage, the length of the suspension time Trest is set to be sufficiently long for making the voltage-time product Srest in the suspension state to be equal to the voltage-time product Son in the ON state, so that the magnetic saturation of the DC reactor can be reset. Since the switching element is in the OFF state in the suspension control, the DC voltage in the DC power supply is applied to the load to maintain the power supply to the load.

(Schematic Configuration of DC Pulse Power Supply Device)

A description will be made about a configuration example and operations of a switching cycle control unit and suspension/restart control unit of the DC pulse power supply device of the invention with reference to FIGS. 4(*a*) to 5(*b*).

In FIGS. 4(*a*) and 4(*b*), a control circuit unit 40 of the DC pulse power supply device comprises a switching cycle control unit 40A for controlling the cycle of the switching operation of the switching element, and suspension/restart control units 40B, 40C for controlling the suspension and restart of the switching operation of the switching element.

In the pulse mode in the normal operation, the switching cycle control unit 40A sends to the drive circuit 23 with an ON/OFF signal of duty corresponding to the electric power to be supplied to the load for controlling the switching operation, thereby generating the pulse output.

When the arc is generated, the switching cycle control unit 40A reduces the electric power to be supplied to the load by the arc mode so as to resolve the arc generation. In the arc mode, the cycle and/or the time width of the ON/OFF operation of the switching element is controlled to change the ON period and the OFF period of the switching element, thereby regulating the electric power to be supplied to the load from the DC power supply.

On the other hand, the suspension/restart control units 40B, 40C suspend the drive circuit 23 by the suspension control when the DC reactor reaches the magnetic saturation, so as to bring the switching element into the OFF state.

During the OFF period of the switching element, the energy accumulated by the DC reactor current during the ON period generates the DC reactor voltage.

Although the DC reactor voltage is clamped by the voltage clamping unit, the length of the suspension time for bringing the switching element into the OFF state is set to be sufficiently long for obtaining a voltage-time product corresponding to the voltage-time product in the ON state to reset the magnetic saturation of the DC reactor while maintaining the power supply to the load. Then, at the time that the magnetic saturation of the DC reactor is reset, a restart signal is sent to the drive circuit 23 to restart the switching operation.

As aspects of the magnetic saturation reset, the suspension/restart control unit 40B shows a configuration example according to the current regulation, and the suspension/restart control unit 40C shows a configuration example according to the time regulation, which include the aspect for performing current regulation based on the DC reactor current iDCL flowing through the switching element and the aspect for performing time regulation based on an accumulated pulse width Tpulse for driving the switching element.

The current regulation is a control aspect for controlling the switching element based on a current value, but the current itself is not a control target. Furthermore, the time regulation is a control aspect for controlling the switching element based on a time of a pulse width, but the time itself is not a control target.

The suspension control and the restart control in the control of the switching element include an aspect that perform the suspension control and the restart control by either the current regulation or time regulation, as well as an aspect that combine the current regulation and the time regulation. Hereinafter, a description will be made about each aspect, i.e. about a first aspect performing the time regulation for the both controls based on the time, a second aspect performing the current regulation for both controls based on the current, a third aspect performing the time regulation for the suspension control based on the time and the current regulation for the restart control based on the current, and a fourth aspect performing the current regulation for the suspension control based on the current and the time regulation for the restart control based on the time.

(Outline of Current Regulation and Time Regulation)

Figure 5A:
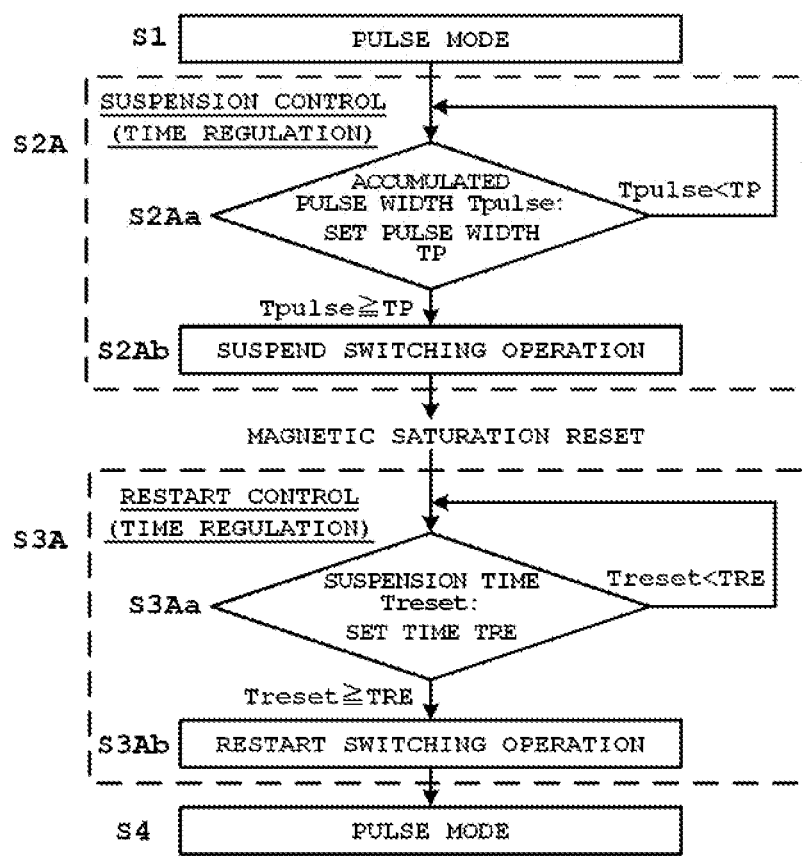
FIGS. 5(a) and 5(b) are a flowchart illustrating first and second aspects for suspension control for the magnetic saturation reset and restart control by the DC power supply device according to the invention.
Figure 5B:
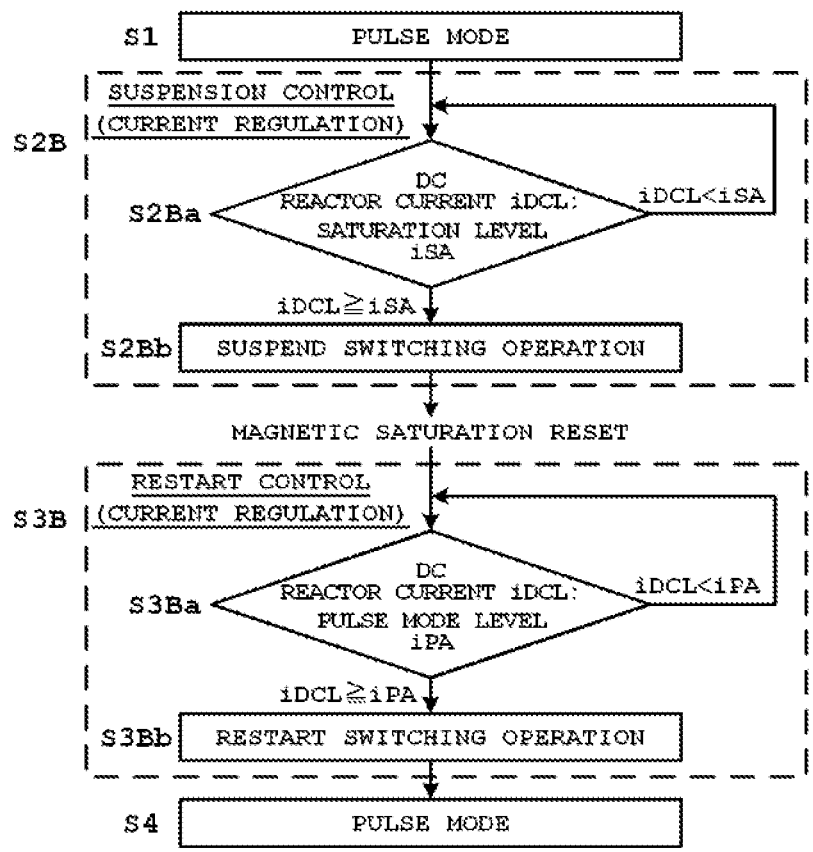

An outline of the suspension control and restart control by the current regulation and the time regulation will be made by referring to the schematic block diagram of FIGS. 4(*a*) and 4(*b*) and the flowcharts of FIGS. 5(*a*) to 6(*b*). FIG. 4(*a*) shows a schematic configuration of the first aspect performing the time regulation for the suspension control and the restart control based on a time, and FIG. 4(*b*) shows a schematic configuration of the second aspect performing the current regulation for the suspension control and the restart control based on a current. As for the third and fourth aspects which combine the time regulation and the current regulation, only the flow is shown with reference to FIGS. 6(*a*) and 6(*b*) and the configurations corresponding to FIGS. 4(*a*) and 4(*b*) will be omitted.

Figure 6A:
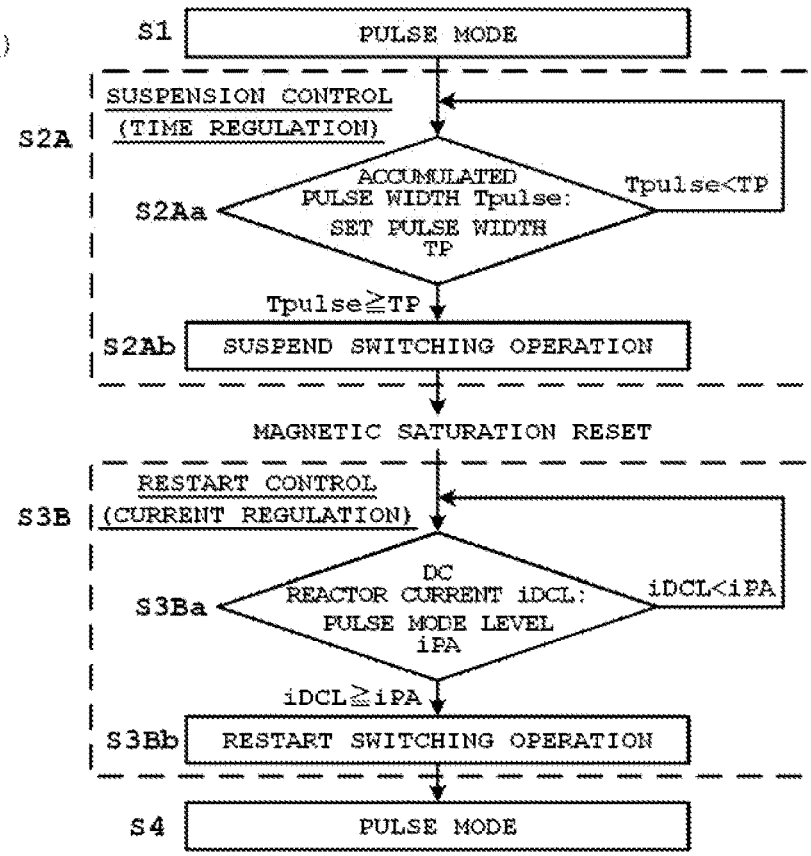
FIGS. 6(a) and 6(b) are a flowchart illustrating third and fourth aspects for suspension control for the magnetic saturation reset and the restart control by the DC power supply device according to the invention.

FIGS. 5(*a*) to 6(*b*) are the flowcharts illustrating the outline of suspension control and the restart control in resetting the magnetic saturation according to the invention, FIGS. 5(*a*) and 5(*b*) being the flowcharts respectively for the first aspect and the second aspect, FIGS. 6(*a*) and 6(*b*) being the flowcharts respectively for the third aspect and the fourth aspect. In the flowcharts in FIGS. 5(*a*) to 6(*b*), the interrupting processing in the arc mode is omitted.

Figure 8:
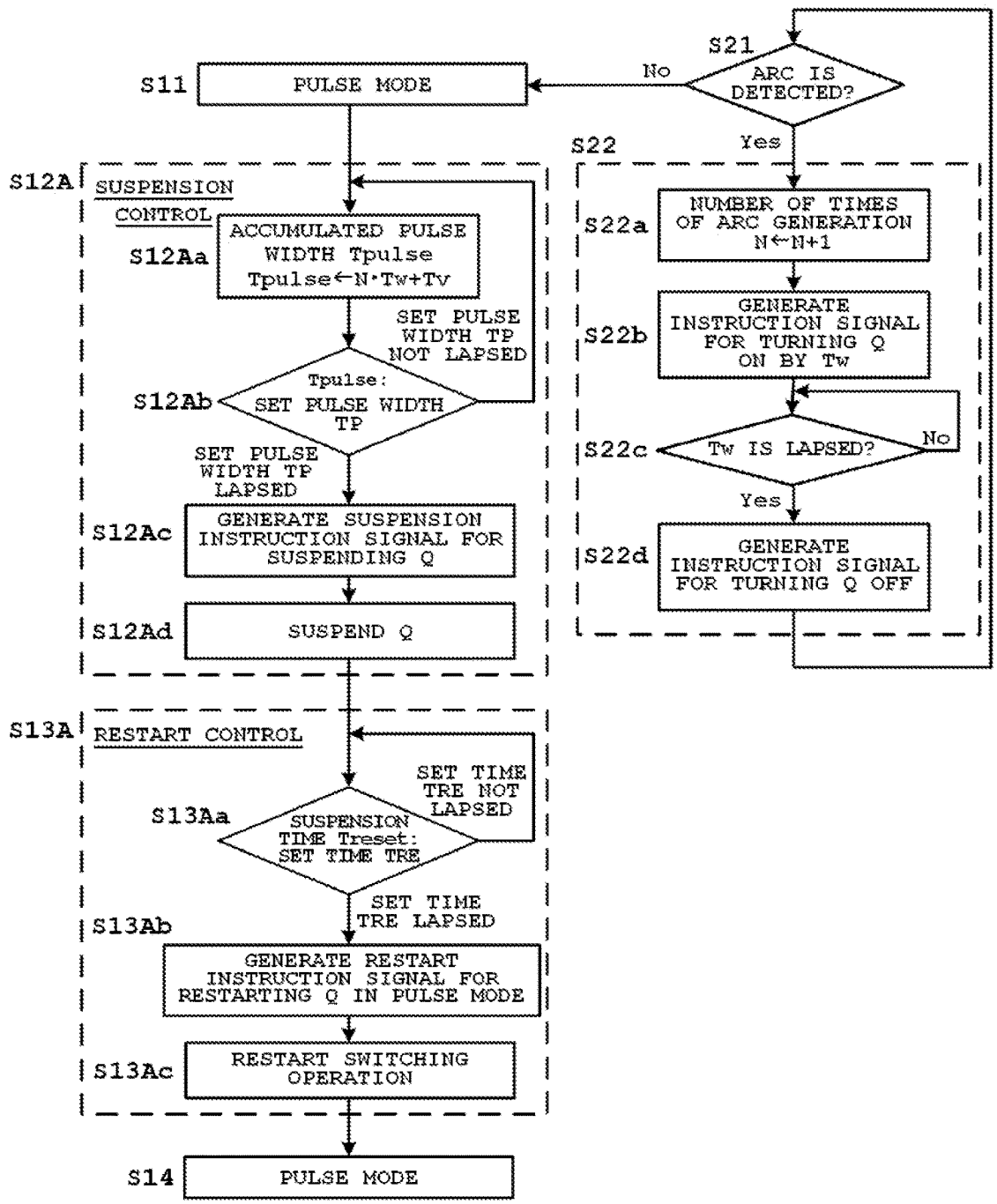
FIG. 8 is a flowchart illustrating a first aspect of the suspension control, the restart control and interrupt processing with an arc mode for the magnetic saturation reset in the DC pulse power supply device with a plasma load according to the invention.
Figure 9:
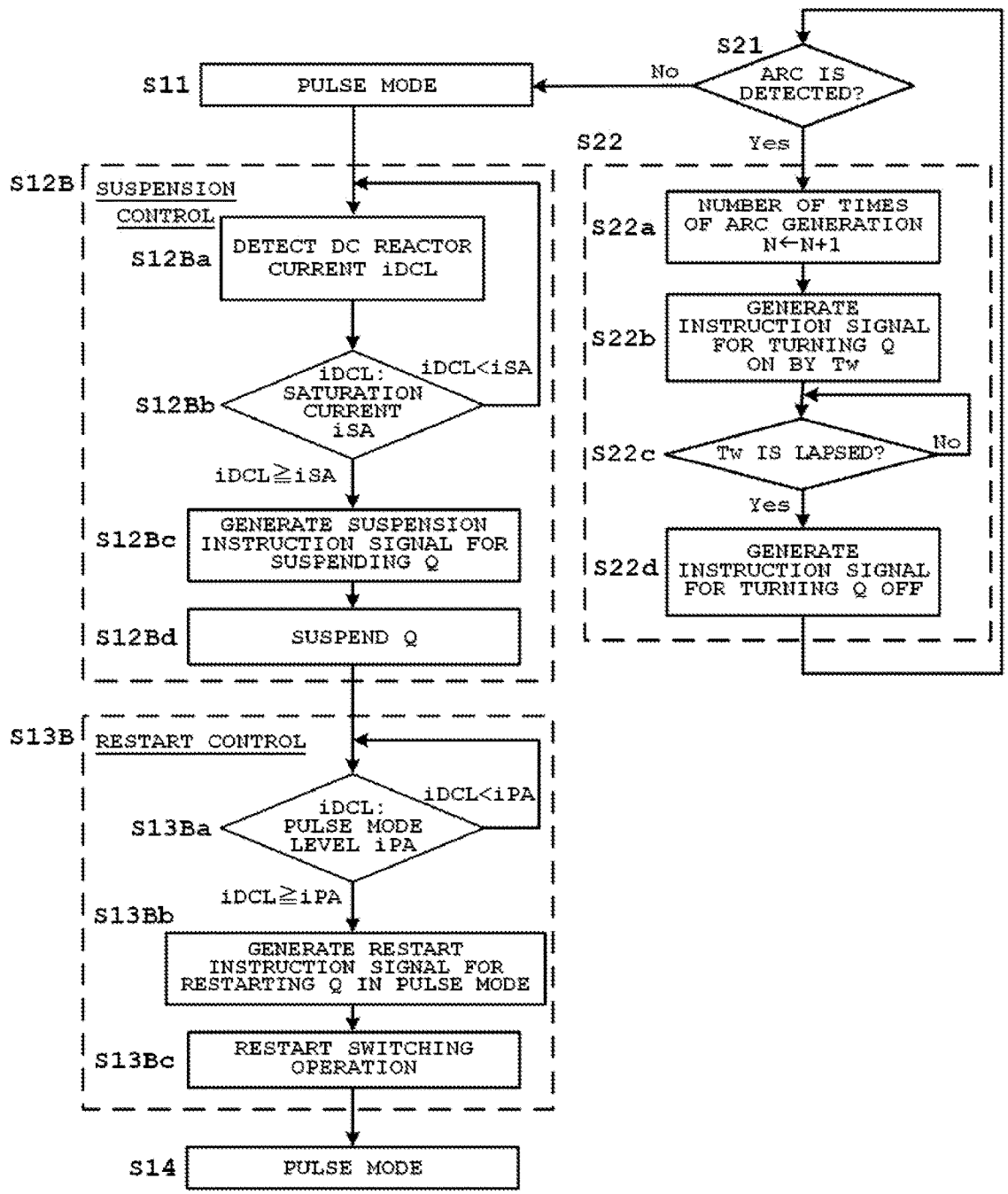
FIG. 9 is a flowchart illustrating a second aspect of the suspension control, the restart control and the interrupt processing of the arc mode for the magnetic saturation reset in the DC power supply device with the plasma load according to the invention.
Figure 10:
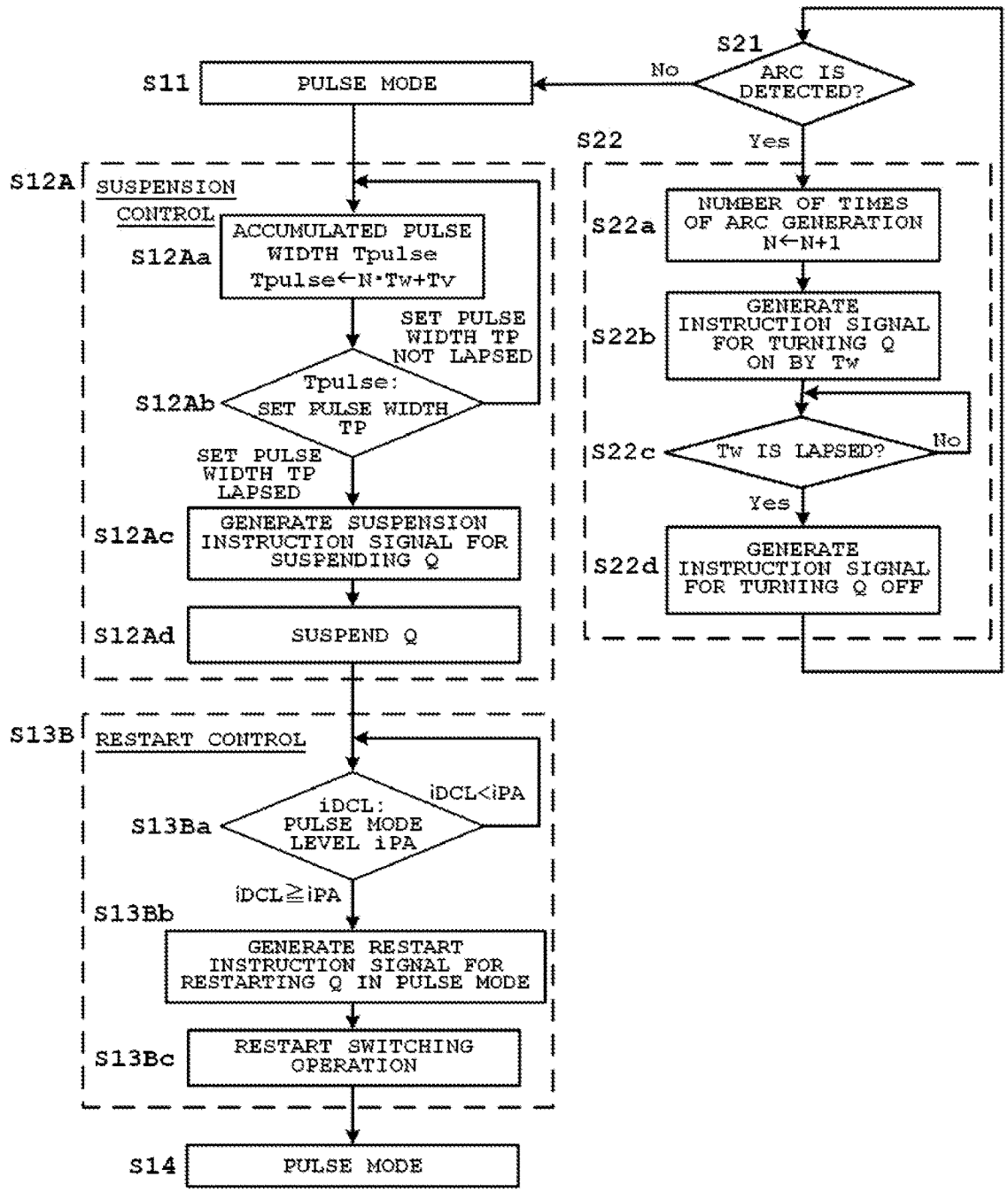
FIG. 10 is a flowchart illustrating a third aspect of the suspension control, the restart control and the interrupt processing with the arc mode for the magnetic saturation reset in the DC power supply device with the plasma load according to the invention.
Figure 11:
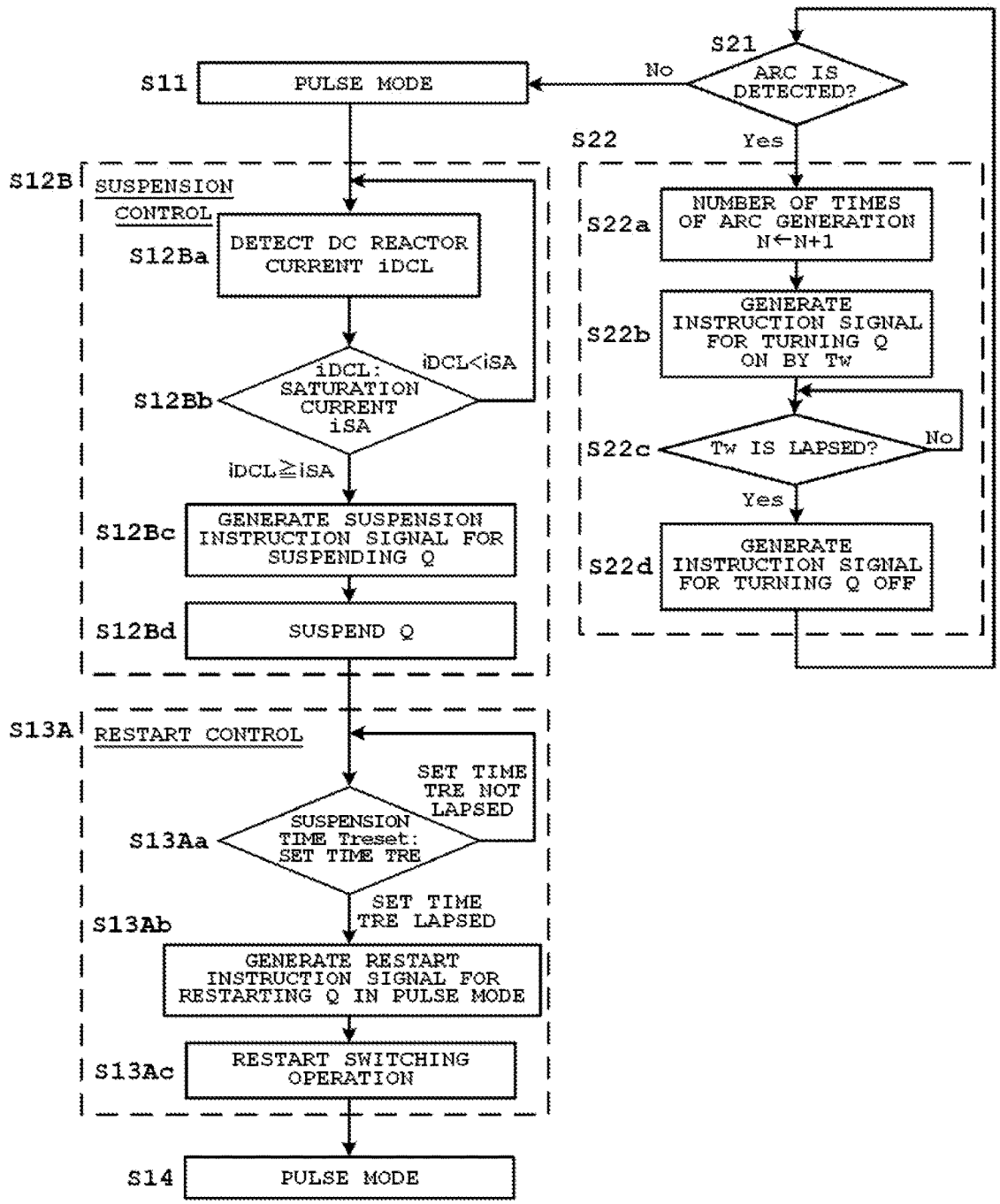
FIG. 11 is a flowchart illustrating a fourth aspect of the suspension control, the restart control and the interrupt processing with the arc mode for the magnetic saturation reset in the DC power supply device with the plasma load according to the invention.

The first aspect and the second aspect will be described in detail later by referring to the flowcharts of FIGS. 8 and 9 along with FIGS. 12(*a*) to 12(*d*), and the third aspect and the fourth aspect will be described later by referring to the flowcharts of FIGS. 10 and 11 along with FIGS. 12(*a*) to 12(*d*).

First Aspect: Aspect of Time Regulation

Now, a description will be made on the first aspect of the time regulation with reference to the block diagram of FIG. 4(*a*) and the flowchart of FIG. 5(*a*). The control circuit unit 40 comprises the switching cycle control unit 40A and the suspension/restart control unit 40B. The switching cycle control unit 40A generates the pulse output in the pulse mode to supply the power to the load, and controlling the cycle to eliminate the arcing state in the arc mode. On the other hand, the suspension/restart control unit 40B performs the time regulation based on a time in the pulse mode to control the suspension and restart operations of the drive circuit to thereby reset the magnetic saturation.

Generally, in the normal operation in the pulse mode, the switching cycle control unit 40A actuates the ON/OFF operation of the switching element 22 of the drive circuit 23 with a predetermined duty to supply a predetermined electric power to the load (S1). In the pulse mode, when a load state detecting unit 60 detects an occurrence of a change in the state of the load, the interrupt processing is performed to interrupt with the arc mode to resolve the state of the load. For example, when an arc is generated in the plasma generation device, the ON/OFF cycle and/or a time width Tw in the ON period of the switching element 22 is changed according to the arc mode to reduce the electric power to be supplied to the plasma load, thereby maintaining the plasma and eliminating the arcing state. The arc mode, for example, generally suppresses the power supply to the load by setting the time width Tw of the ON period to 10 μs with respect to the pulse mode in the pulse cycle with the time width Tw of 5 μs. In the ON/OFF operation in the arc mode, a voltage applied to the DC reactor during the OFF period is clamped, and thus the voltage-time product becomes insufficient for resetting the magnetic saturation, so that the DC reactor is in the magnetic deviation and reaches the magnetic saturation.

The suspension/restart control unit 40B turns the switching element 22 into the OFF state and suspend to eliminate the magnetic saturation occurred in the arc mode. The suspension/restart control unit 40B detects that the DC reactor reaches the magnetic saturation and then performs the suspension/restart operation. In the aspect of the time regulation, the magnetic saturation is detected based on the time width Tw in the ON period of the switching element. Since the suspension/restart control maintains the power supply to the load from the DC power supply without stopping, the restart operation can be performed without rebooting the devices on the load side.

In the suspension control with the time regulation (S2A), the suspension/restart control unit 40B accumulates each time width Tw to obtain the accumulated pulse width Tpulse according to the time width Tw of the ON period in the arc mode in the switching cycle control unit 40A. The accumulated pulse width Tpulse corresponds to a time of the voltage-time product of the magnetic saturation of the DC reactor. Since the voltage of the DC reactor is clamped, the accumulated pulse width Tpulse which is obtained is compared with the set pulse width TP, and when the accumulated pulse width Tpulse exceeds the set pulse width TP, the suspension/restart control unit 40B determines that the DC reactor reaches the magnetic saturation (S2Aa). In here, the set pulse width TP can be set by obtaining in advance the accumulated pulse width Tpulse until the time when the DC reactor has reached the magnetic saturation.

Upon the determination that the DC reactor reaches the magnetic saturation (S2Aa), the suspension/restart control unit 40B sends a suspension signal to the drive circuit 23 to bring the switching element 22 of the pulsing unit 20 into the OFF state (S2Ab), so as to reset the magnetic saturation of the DC reactor 21. The pulsing unit 20 maintains the power supply to the load in the suspension state by limiting the electric power at a predetermined level without completely stopping the power supply.

In the restart control with the time regulation (S3A), the suspension/restart control unit 40B measures the suspension time Treset during the suspension state and compares the suspension time Treset with the set time TRE, when the suspension time Treset exceeds the set time TRE, the control unit 40B determines that the magnetic saturation of the DC reactor is reset (S3Aa). In here, the set time TRE can be set by obtaining in advance the length of the suspension time Treset until the time when the magnetic saturation of the DC reactor is reset.

Upon the determination that the magnetic saturation of the DC reactor is reset (S3Aa), the suspension/restart control unit 40B sends a restart signal to the drive circuit 23, and the drive circuit 23 resumes the operation of the pulse mode from the suspension mode of the pulse mode (S3Ab).

Second Aspect: Aspect of Current Regulation

The second aspect of the current regulation will be described with reference to the block diagram of FIG. 4(*b*) and the flowchart of FIG. 5(*b*). The control circuit unit 40 comprises the switching cycle control unit 40A and the suspension/restart control unit 40C. The switching cycle control unit 40A generates a pulse output in the pulse mode to supply the power to the load, and controls the cycle in the arc mode to eliminate the arcing state. On the other hand, the suspension/restart control unit 40C performs the current regulation based on the current in the pulse mode to control the suspension and restart of the drive operation of the drive circuit so as to reset the magnetic saturation.

In general, the switching cycle control unit 40A in the normal operation in the pulse mode performs the ON/OFF operation of the switching element 22 of the drive circuit 23 with a predetermined duty to supply predetermined electric power to the load (S1). In the pulse mode, when the load state detecting unit 60 detects the occurrence of the change in the load state, the interrupt processing is performed to turn into the arc mode for eliminating the abnormality in the load, as with the case of the first aspect.

The suspension/restart control unit 40C brings the switching element 22 into the OFF state and suspend to eliminate the magnetic saturation occurred in the arc mode. The suspension/restart control unit 40C performs the suspension/restart operation after detecting that the DC reactor reaches the magnetic saturation. Since the suspension/restart control by the aspect of the current regulation does not stop the power supply from the DC power supply to the load to maintain the power supply, the restart can be performed without rebooting the devices on the load side.

In the suspension control with the current regulation (S2B), the suspension/restart control unit 40C compares the DC reactor current iDCL with the saturation current level iSA, and when the DC reactor current iDCL exceeds the saturation current level iSA, the suspension/restart control unit 40C determines that the DC reactor reaches the magnetic saturation (S2Ba).

Upon the determination that the DC reactor reaches the magnetic saturation (S2Ba), the suspension/restart control unit 40C sends a suspension signal to the drive circuit 23 to bring the switching element 22 of the pulsing unit 20 into the OFF state (S2Bb), so as to reset the magnetic saturation of the DC reactor 21. The pulsing unit 20 continues the power supply to the load in the suspension state by limiting the electric power at a predetermined level without completely stopping the power supply.

In the restart control with the current regulation (S3B), the suspension/restart control unit 40C detects the DC reactor current (iDCL) of the switching element, and when the DC reactor current (iDCL) exceeds the pulse mode level (iPA) of the DC reactor current in the pulse mode, the suspension/restart control unit 40C determines that the magnetic saturation of the DC reactor is reset (S3Ba).

Upon the determination that the magnetic saturation of the DC reactor is reset (S3Ba), the suspension/restart control unit 40C sends a restart signal to the drive circuit 23, thereby allowing the drive circuit 23 to change the operation from the suspension state in the pulse mode to the restart state in the pulse mode (S3Bb) so as to perform the operation in the pulse mode (S4).

Third Aspect: Aspect of Combining Time Regulation and Current Regulation

The third aspect of combining the time regulation and the current regulation will be described by referring to the flowchart of FIG. 6(*a*). In this figure, a configuration example of the third aspect will be omitted.

The switching cycle control unit generates a pulse output in the pulse mode to supply electric power to the load, thereby eliminating the arcing state in the arc mode by the cycle control. On the other hand, the suspension/restart control unit controls the suspension of the drive operation of the drive circuit with the time regulation based on a time in the pulse mode and controls the restart of the drive operation of the drive circuit with the current regulation based on a current, thereby resetting the magnetic saturation.

In the pulse mode, the switching cycle control unit drives the switching element with a predetermined duty to supply predetermined power to the load (S1). When the load state detecting unit 60 detects the occurrence of change in the load state in the pulse mode, the interrupt processing is performed to turn into the arc mode to eliminate the abnormality in the load, as with the case of the first aspect.

In the suspension control with the time regulation (S2A), the suspension/restart control unit accumulates each time width Tw to obtain the accumulated pulse width Tpulse according to the time width Tw of the ON period in the arc mode of the switching cycle control unit. The accumulated pulse width Tpulse corresponds to a time of the voltage-time product of the magnetic saturation of the DC reactor. Since the voltage of the DC reactor is clamped, the accumulated pulse width Tpulse which is obtained is compared with the set pulse width TP, and when the accumulated pulse width Tpulse exceeds the set pulse width TP, the suspension/restart control unit determines that the DC reactor reaches the magnetic saturation (S2Aa). In here, the set pulse width TP can be set by obtaining in advance the accumulated pulse width Tpulse until the time when the DC reactor has reached the magnetic saturation.

Upon the determination that the DC reactor reaches the magnetic saturation (S2Aa), the suspension/restart control unit sends a suspension signal to the drive circuit 23 to bring the switching element 22 of the pulsing unit 20 into the OFF state to be in the suspension state (S2Ab), so as to reset the magnetic saturation of the DC reactor 21. The pulsing unit 20 maintains the power supply to the load in the suspension state by limiting the electric power at a predetermined level without completely stopping the power supply.

In the restart control with the current regulation (S3B), the suspension/restart control unit detects the DC reactor current (iDCL) of the switching element, and when the DC reactor current (iDCL) exceeds the pulse mode level (iPA) of the DC reactor current in the pulse mode, the suspension/restart control unit determines that the magnetic saturation of the DC reactor is reset (S3Ba).

Upon the determination that the magnetic saturation of the DC reactor is reset (S3Ba), the suspension/restart control unit sends a restart signal to the drive circuit 23, thereby allowing the drive circuit 23 to change the operation from the suspension state in the pulse mode to the restart state in the pulse mode (S3Bb), so as to perform the operation in the pulse mode (S4).

Fourth Aspect: Aspect of Combining Current Regulation and Time Regulation

Figure 6B:
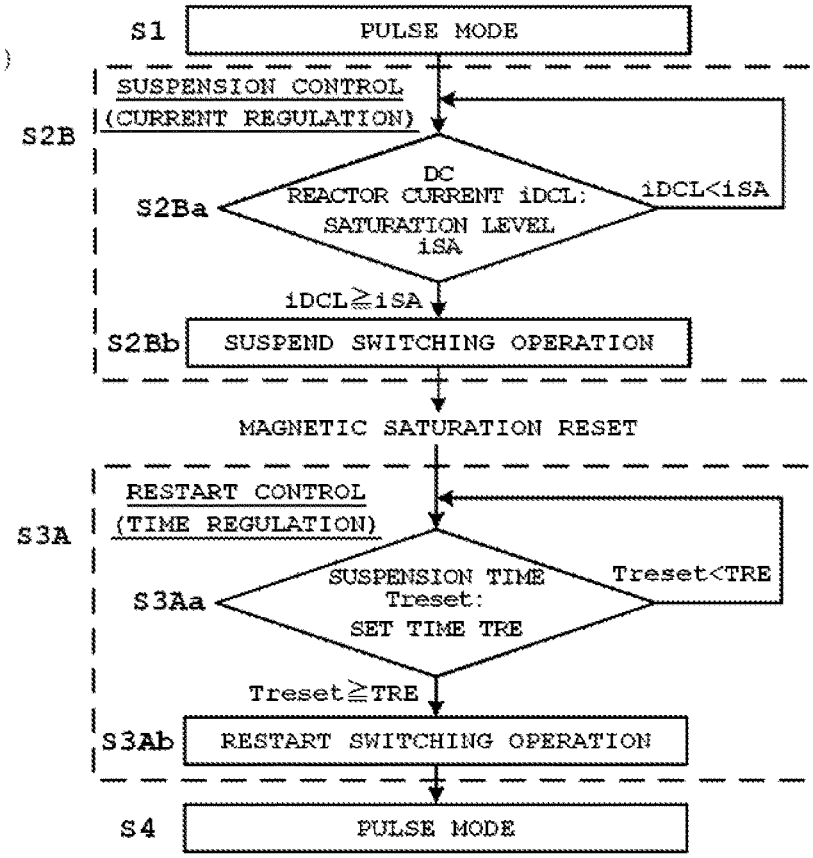

The Fourth aspect of combining the current regulation and the time regulation will be described by referring to the flowchart of FIG. 6(b). In this figure, a configuration example of the fourth aspect will be omitted.

The switching cycle control unit generates a pulse output in the pulse mode to supply power to the load, thereby eliminating the arcing state in the arc mode by the cycle control. On the other hand, the suspension/restart control unit controls the suspension of the drive operation of the drive circuit with the time regulation based on a time in the pulse mode and controls the restart of the drive operation of the drive circuit with the current regulation based on a current, thereby resetting the magnetic saturation.

In the pulse mode, the switching cycle control unit drives the switching element with a predetermined duty to supply predetermined electric power to the load (S1). When the load state detecting unit 60 detects the occurrence of change in the load state in the pulse mode, the interrupt processing is performed to turn into the arc mode to eliminate the abnormality in the load, as with case of the first aspect.

The suspension/restart control unit brings the switching element 22 into the OFF state to suspend it, and eliminates the magnetic saturation occurred in the arc mode. Upon the detection that the DC reactor reaches the magnetic saturation, the suspension/restart control unit performs the suspension/restart operation. Since the suspension/restart control according to the aspect of the current regulation maintains the power supply to the load from the DC power supply without stopping the power supply, the restart can be performed without rebooting the devices on the load side.

In the suspension control with the current regulation (S2B), the suspension/restart control unit compares the DC reactor current iDCL with the saturation current level iSA, and when the DC reactor current iDCL exceeds the saturation current level iSA, the suspension/restart control unit determines that the DC reactor reaches the magnetic saturation (S2Ba).

Upon the determination that the DC reactor reaches the magnetic saturation (S2Ba), the suspension/restart control unit sends a suspension signal to the drive circuit 23 to bring the switching element 22 of the pulsing unit 20 into the OFF state (S2Bb), so as to reset the magnetic saturation of the DC reactor 21. The pulsing unit 20 continues the power supply to the load in the suspension state by limiting the electric power at a predetermined level without completely stopping the power supply.

In the restart control with the time regulation (S3A), the suspension/restart control unit measures the suspension time Treset during the suspension state and compares the suspension time Treset with the set time TRE, and when the suspension time Treset exceeds the set time TRE, the suspension/restart control unit determines that the magnetic saturation of the DC reactor is reset (S3Aa). In here, the set time TRE can be set by obtaining in advance the length of the suspension time Treset until the time when the magnetic saturation of the DC reactor is reset.

Upon the determination that the magnetic saturation of the DC reactor is reset (S3Aa), the suspension/restart control unit sends a restart signal to the drive circuit 23, thereby allowing the drive circuit 23 to move out the suspension state in the pulse mode to restart the operation in the pulse mode (S3Ab).

(Configuration Example of DC Pulse Power Supply Device)

A configuration example and an operation of the DC pulse power supply device of the present invention will be described by referring to FIGS. 7 to 13(b). In particular, the pulse mode and an interrupt with the arc mode will be described.

Figure 7:
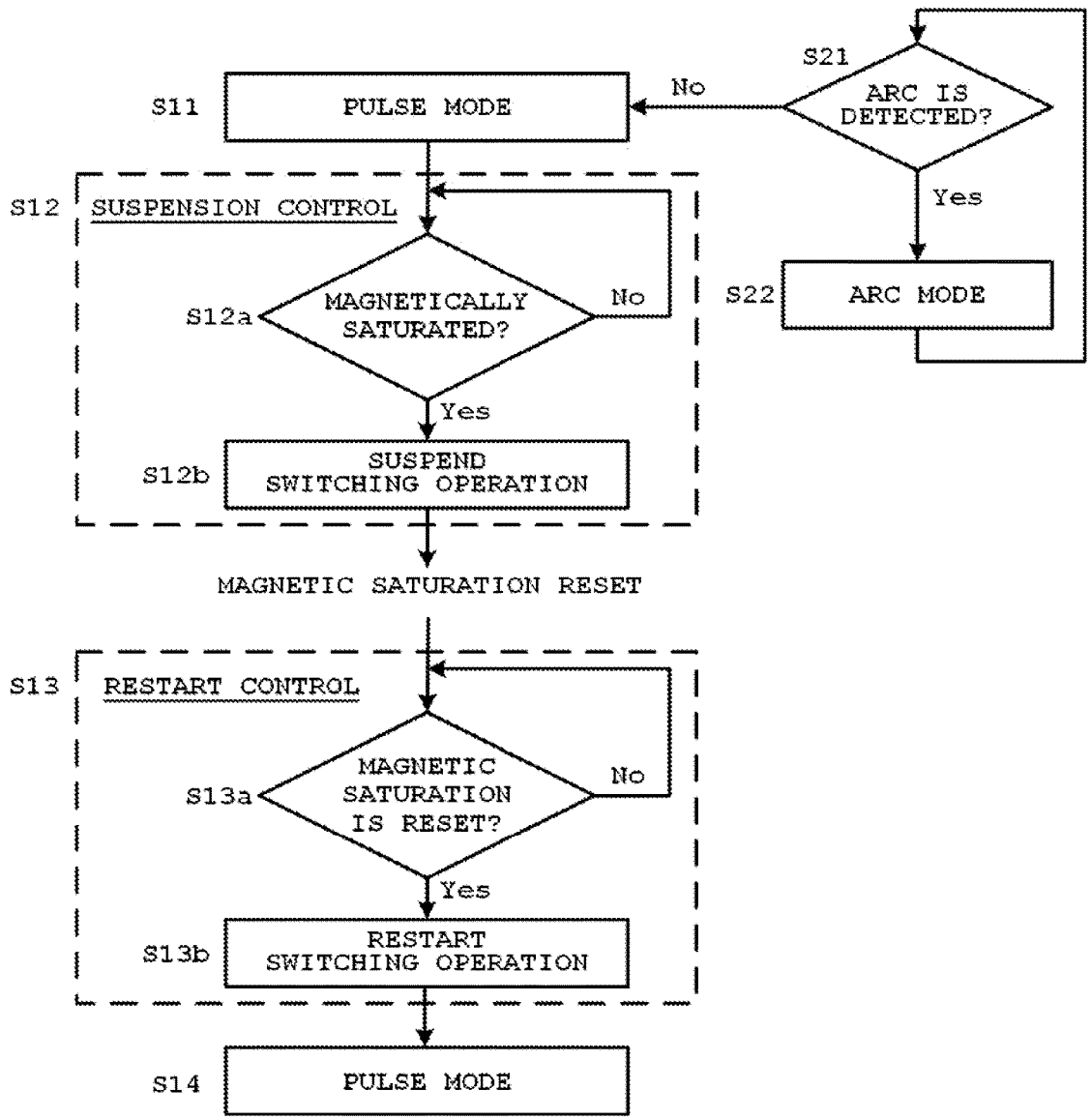
FIG. 7 is a flowchart illustrating schematic operations of the suspension control for the magnetic saturation reset and the restart control by the DC power supply device according to the invention.

First, an operation of the suspension control for resetting the magnetic saturation and the restart control by the DC pulse power supply device will be summarized by referring to the flowchart of FIG. 7. Then, the first aspect with the current regulation, the second aspect with the time control, the third aspect with the time regulation and the current regulation_ and the fourth aspect with the current regulation and the time regulation will be described by referring to the flowcharts of FIGS. 8 to 11 and the configuration examples of FIGS. 12(a) to 13(b). In here, all aspects use a plasma generation device as load.

(Arc Mode Interrupt Processing)

The DC pulse power supply device outputs a pulse output to a plasma load in the pulse mode in a normal state after plasma ignition, so as to maintain a plasma state.

In the pulse mode (S11), when an arcing state in which an arc generates while the plasma vanishes is detected (S21), the arc mode is interrupted to change a cycle of driving the switching element, thereby reducing the electric power to be supplied to the load to eliminate the arcing state (S22). The interrupt with the arc mode is maintained until the arc vanishes.

In the ON/OFF operation of the switching element in the arc mode, a voltage applied to the DC reactor in the OFF state is clamped, resulting in the occurrence of the magnetic deviation that leads to the magnetic saturation. When the DC reactor reaches the magnetic saturation, the suspension control (S12) and the restart control (S13) are performed to reset the magnetic saturation, and then the pulse output is output in the pulse mode (S14).

In the suspension/restart control, the suspension control (S12) suspends the drive circuit upon the detection of the magnetic saturation (S12a) and brings the switching element into the OFF state (S12b) such that the OFF state is maintained during the suspension time to equalize a voltage-time product to a voltage-time product in the ON state, thereby resetting the magnetic saturation of the DC reactor.

In the restart control (S13), after the reset of the magnetic saturation (S13a), the switching operation of the drive circuit in the pulse mode (S13b) is restarted, and the pulse output is output in the pulse mode (S14).

First Aspect

A description will be made about a configuration example of the first aspect with the time regulation and its control flowchart with reference to FIGS. 12(a) and 8. The configuration example of FIG. 12(a) corresponds to the schematic configuration example of FIG. 4(a), and the flowchart of FIG. 8 corresponds to the flowchart of FIG. 5(a). Furthermore, FIG. 14(a) shows a waveform chart by the time regulation based on a time.

(Configuration Example of Time Regulation)

Figure 12A:
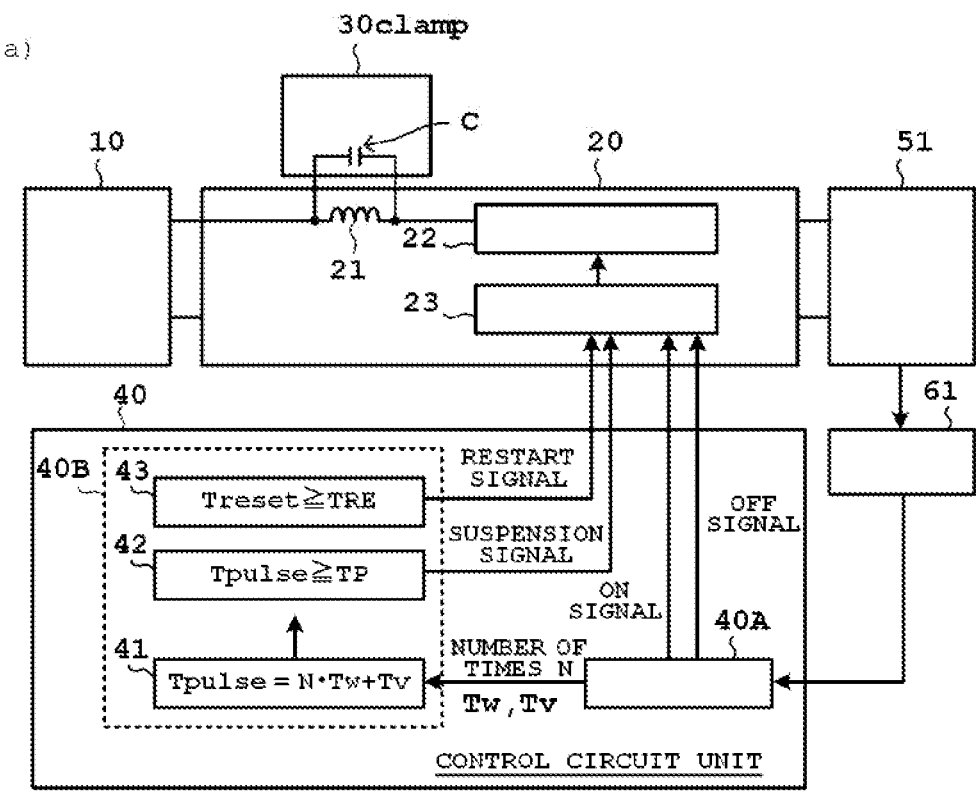
FIGS. 12(a) and 12(b) are a block diagram illustrating configuration examples of the first and second aspects in the DC power supply device with the plasma load according to the invention.

In FIG. 12(a), the control circuit unit 40 comprises the switching cycle control unit 40A and the suspension/restart control unit 40B.

The switching cycle control unit 40A controls the normal pulse mode operation (S11), and also interrupts with the arc mode upon a detection of an arc by the arc detecting circuit 61 (S21). In the arc mode, the control unit 40A counts the number of times N of arc generation (S22a), while varying the time width of the ON time of the switching element 22 to the time width Tw in the arcing state, and the switching element 22 is brought into the ON state during the pulse width Tw (S22b). After the lapse of the time width Tw (S22c), the switching cycle control unit 40A brings the switching element 22 into the OFF state (S22d). In this context, T is a time width of a pulse cycle in the pulsing unit, and the time width Tw is set to shorter than the time width T of the pulse cycle. By performing the steps S22a to S22d, the ON/OFF operation of the switching element 22 in the cycle of the arc mode is repeated to thereby eliminate the arc (S21).

In the pulse mode, the suspension/restart control unit 40B performs the suspension/restart control to reset the magnetic saturation caused by the arc mode (S12A, S13A).

The suspension/restart control unit 40B comprises an accumulated pulse width computing unit 41, a pulse width comparing unit 42 and a suspension time comparing unit 43, as a configuration for time regulation for the suspension and restart of the pulsing unit.

(S12A: Suspension Control)

The accumulated pulse width computing unit 41 computes the accumulated pulse width Tpulse of the time width Tw for bringing the switching element 22 into the ON state based on the number of times of occurrence N in arcing state. The accumulated pulse width Tpulse can be obtained by a formula Tpulse=Tw×N+Tv. The accumulated pulse width Tpulse is the time width when the DC reactor current iDCL reaches the saturation current level iSA from the time of a first arc generation, and assuming that the number of times of arc generation that exceeds the saturation current level iSA at the time of next arc generation is defined as N, after the mode is turned to the pulse mode after N-times, the time width from when the switching element Q goes into the ON state until the DC reactor current iDCL reaches the saturation current level iSA is set as Tv (S12Aa).

The pulse width comparing unit 42 compares the accumulated pulse width Tpulse which is computed with the set pulse width TP (S12Ab), sends a suspension signal to the drive circuit 23 when the accumulated pulse width Tpulse exceeds the set pulse width TP (S12Ac), and brings the switching element 22 into the OFF state to suspend the operation of the pulsing unit 20 (S12Ad). The flowchart shows the switching element with Q.

(S13A: Restart Control)

The suspension time comparing unit 43 measures the suspension time Treset for suspending the operation of the pulsing unit 20 to reset the magnetic saturation, and compares the suspension time Treset with the set time TRE. The set time TRE can be set by obtaining in advance a time taken for resetting the magnetic saturation of the DC reactor by a reset current ireset sent from the capacitor (S13Aa).

After the suspension time Treset exceeds the set time TRE, a restart signal is sent to the drive circuit 23 (S13Ab), and thereby the switching element 22 is turned into the ON state to change the duty for activating the operation in the normal pulse mode so as to restart the operation of the pulsing unit 20 (S13Ac).

Second Aspect

A description will be made about a configuration example of the second aspect with the current regulation and its control flowchart with reference to FIGS. 12(b) and 9. The configuration example of FIG. 12(b) corresponds to the schematic configuration example of FIG. 4(b), and the flowchart of FIG. 9 corresponds to the flowchart of FIG. 5(b). Furthermore, FIG. 14(a) shows a waveform chart by the time regulation based on a time.

(Configuration Example of Current Regulation)

Figure 12B:
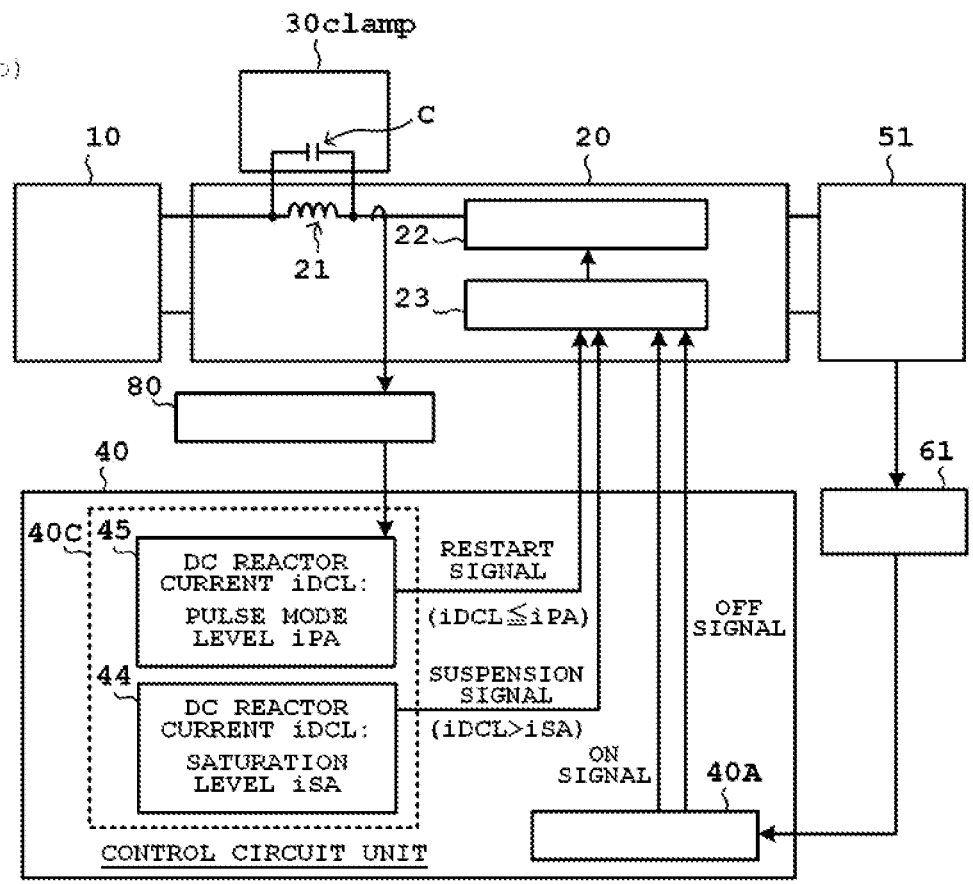

In FIG. 12(b), the control circuit unit 40 comprises the switching cycle control unit 40A and the suspension/restart control unit 40C.

The switching cycle control unit 40A controls the normal pulse mode operation (S11), as with the case of the first aspects, and performs the interrupt processing to interrupt with the arc mode when the arc detecting circuit 61 detects the arc (S21). The arc mode counts the number of times N of arc generation (S22a), and changes the time width of the ON time of the switching element 22 in the arcing state into the width Tw so as to allow the switching element 22 to be in the ON state during the time width Tw (S22b). After the lapse of the time width Tw (S22c), the switching element 22 is brought into the OFF state (S22d). In this context, T is a time width of the pulse cycle in the pulsing unit, and the time width Tw is defined to be shorter than the time width T of the pulse cycle. By performing the steps S22a to S22d, the ON/OFF operation of the switching element 22 in the cycle of the arc mode is repeated to eliminate the arc (S21).

In the pulse mode, the suspension/restart control unit 40B performs the suspension/restart control to reset the magnetic saturation caused by the arc mode (S12B, S13B).

The suspension/restart control unit 40C comprises a saturation level comparing unit 44 and a pulse mode level comparing unit 45 as a configuration for the time regulation for the suspension and restart of the pulsing unit.

(Suspension Control: S12B) The saturation level comparing unit 44 enables a DC reactor current detecting unit 80 to input the DC reactor current iDCL (S12Ba), compares the DC reactor current iDCL with the saturation current level iSA (Sl2Bb), and sends a suspension signal to the drive circuit 23 when the DC reactor current iDCL exceeds the saturation current level iSA (S12Bc), so as to bring the switching element 22 in to the OFF state to suspend the operation of the pulsing unit 20 (S12Bd). The flowchart shows the switching element with Q.

(Restart Control: S13B)

The pulse mode level comparing unit 45 compares the DC reactor current iDCL with the pulse mode level iPA in the suspension state (S13Ba), and determines that the magnetic saturation is reset when the DC reactor current iDCL exceeds the pulse mode level iPA. The pulse mode level iPA can be set by obtaining in advance the DC reactor current iDCL at the time that the pulsing unit is in the normal pulse mode operation.

The pulse mode level comparing unit 45 sends a restart signal to the drive circuit 23 upon the determination that the magnetic saturation of the DC reactor is reset (Sl3Bb), makes the pulsing unit 20 restart from the suspension state and perform the pulse mode operation (S13Bc).

(Third Aspect)

By referring to FIGS. 13(*a*) and 10, a description will be made about a configuration example and its control flowchart of the third aspect, in which the suspension control is performed with the time regulation and the restart control is performed with the current regulation. The configuration example of FIG. 13(*a*) corresponds to the schematic configuration example of FIG. 5(*a*), and the flowchart of FIG. 10 corresponds to the flowchart of FIG. 6(*a*).

(Configuration Example of Time and Current Regulations)

Figure 13A:
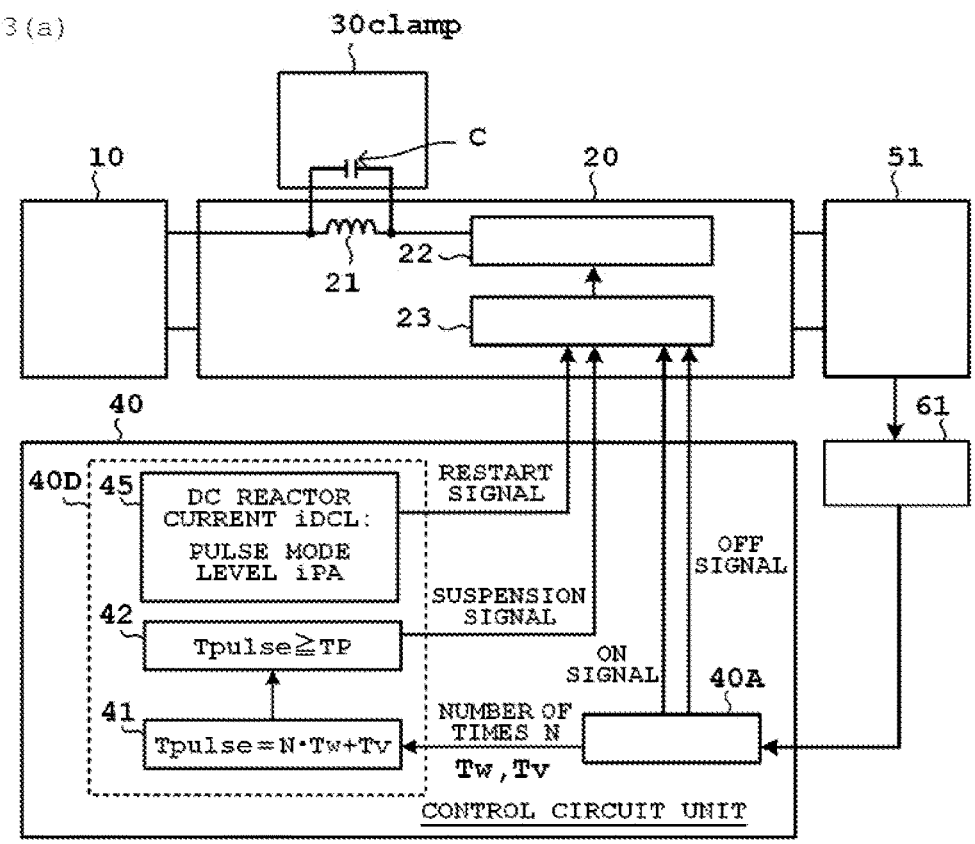
FIGS. 13(a) and 13(b) are a block diagram illustrating configuration examples of the third and fourth aspects in the DC power supply device with the plasma load according to the invention.
Figure 13B:
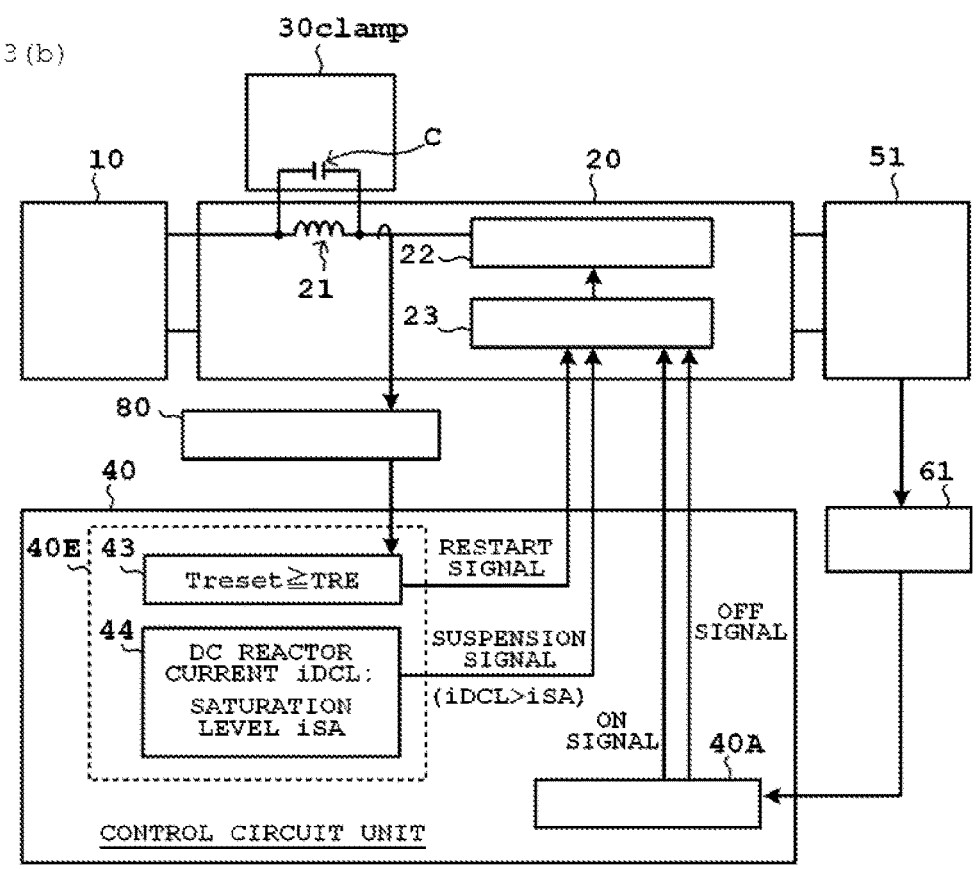

In FIG. 13(*a*), the control circuit unit 40 comprises the switching cycle control unit 40A and a suspension/restart control unit 40D.

The configuration of the switching cycle control unit 40A and its control operation are the same as those in the first aspect, and thus the details thereof will not be described.

The suspension/restart control unit 40D comprises the accumulated pulse width computing unit 41 and the pulse width comparing unit 42 as the configuration to perform the time regulation for the suspension control of the pulsing unit, and also comprises the pulse mode level comparing unit 45 as the configuration to perform the current regulation for the restart control of the pulsing unit.

(S12A: Suspension Control)

The accumulated pulse width computing unit 41 computes the accumulated pulse width Tpulse of the time width Tw for bringing the switching element 22 into the ON state based on the number of times N of occurrence in arcing state. The accumulated pulse width Tpulse can be obtained by a formula Tpulse=Tw×N+Tv. The accumulated pulse width Tpulse is the time width that the DC reactor current iDCL reaches the saturation current level iSA from the time of a first arc generation, and assuming that the number of times of arc generation that exceeds the saturation current level iSA at the time of next arc generation is defined as N, after the mode is turned to the pulse mode after N-times, the time width from when the switching element Q goes into the ON state until the DC reactor current iDCL reaches the saturation current level iSA is set as Tv (S12Aa).

The pulse width comparing unit 42 compares the accumulated pulse width Tpulse which is computed with the set pulse width TP (S112Ab), sends a suspension signal to the drive circuit 23 when the accumulated pulse width Tpulse exceeds the set pulse width TP (S12Ac), and brings the switching element 22 into the OFF state to suspend the operation of the pulsing unit 20 (S12Ad). The flowchart shows the switching element with Q.

(S13B: Restart Control)

The pulse mode level comparing unit 45 compares the DC reactor current iDCL with the pulse mode level iPA in the suspension state (S13Ba), and determines that the magnetic saturation of the DC reactor is reset when the DC reactor current iDCL exceeds the pulse mode level iPA. The pulse mode level iPA can be set by obtaining in advance the DC reactor current iDCL at the time that the pulsing unit is in the normal pulse mode operation.

Upon the determination that the magnetic saturation of the DC reactor is reset, the pulse mode level comparing unit 45 sends a restart signal to the drive circuit 23 (S13Bb), so as to move the pulsing unit 20 out the suspension state to restart the pulse mode operation (S13Bc).

(Fourth Aspect)

By referring to FIGS. 13(*b*) and 11, a description will be made about a configuration example and its control flowchart of a fourth aspect, in which the suspension control is performed with the current regulation and the restart control is performed with the time regulation. The configuration of FIG. 13(*b*) corresponds to the schematic configuration example of FIG. 5(*b*), and the flowchart of FIG. 11 corresponds to the flowchart of FIG. 6(*b*).

(Configuration Example of Current and Time Regulations)

In FIG. 13(*b*), the control circuit unit 40 comprises the switching cycle control unit 40A and a suspension/restart control unit 40E.

The configuration of the switching cycle control unit 40A and its control operation are the same as those in the first aspect, and thus the details thereof will not be described.

The suspension/restart control unit 40E comprises the saturation level comparing unit 44 as the configuration to perform the current regulation for the suspension control of the pulsing unit, and the suspension time comparing unit 43 as the configuration to perform the time regulation for the restart control of the pulsing unit.

(S12B: Suspension Control)

The saturation level comparing unit 44 enables the DC reactor current detecting unit 80 to input the DC reactor current iDCL (S12Ba), compares the DC reactor current iDCL with the saturation current level iSA (Sl2Bb), and sends a suspension signal to the drive circuit 23 (S12Bc) when the DC reactor current iDCL exceeds the saturation current level iSA, so as to bring the switching element 22 into the OFF state to suspend the operation of the pulsing unit 20 (S12Bd). The flowchart shows the switching element with Q.

(S13A: Restart Control)

The suspension time comparing unit 43 measures the suspension time Treset for suspending the operation of the pulsing unit 20 to reset the magnetic saturation, and compares the suspension time Treset with the set time TRE. The set time TRE can be set by obtaining in advance a time taken for resetting the magnetic saturation of the DC reactor by the reset current ireset sent from the capacitor (S13Aa).

After the suspension time Treset exceeds the set time TRE, a restart signal is sent to the drive circuit 23 (S13Ab), and thereby the switching element 22 is turned into the ON state to change the duty for activating the operation in the normal pulse mode so as to restart the operation of the pulsing unit 20 (S13Ac).

(Configuration Example of DC Pulse Power Supply Device)

Now, the configuration example of the DC pulse power supply device will be described. The pulsing unit of the DC pulse power supply device in the illustrative configuration example comprises a regeneration unit for regenerating a reset voltage of the DC reactor as voltage clamping unit for clamping the voltage of the DC reactor. The voltage clamping unit clamps the voltage of the DC reactor to avoid damage to the switching element caused by a surge voltage generated by a leakage inductance of the DC reactor.

In the DC pulse power supply device comprising the voltage clamping unit formed of the regeneration unit, the magnetic saturation caused by clamping a voltage across the DC reactor is reset by the control circuit unit that controls the suspension/restart of the drive circuit of the switching element.

The regeneration unit comprises a capacitor connected in parallel with the DC reactor as a configuration for regenerating a reset voltage of the DC reactor. A DC pulse power supply device described below is an example of a configuration to use the capacitor of the regeneration unit together with a capacitor for resetting the magnetic saturation of the DC reactor.

A first configuration example is for regenerating a DC reactor voltage across the DC reactor of the step-up chopper circuit, and a second to fifth configuration example are for regenerating the DC reactor voltage in one of two magnetically coupled DC reactors of the step-up chopper circuit. The magnetically-coupled two DC reactors of the second and fifth configuration examples are tapped autotransformers, and the magnetically-coupled two DC reactors of the third and fourth configuration examples are multi-winding transformers. As to the DC reactor current to be regenerated, the first to fifth configuration examples uses a voltage on a low-voltage side of the DC power supply as a reference voltage.

(First Configuration Example of DC Pulse Power Supply Device)

The first configuration example of the DC pulse power supply device of the present invention will be described by referring to FIG. 15.

The DC pulse power supply device of the invention comprises the DC power supply unit (DC unit) 10, a pulsing unit 20A that supplies to the load 4 with a pulse output generated by the step-up chopper circuit connected to the DC power supply unit 10, the regeneration unit 30 that regenerates an excessively-risen component of a voltage in the pulsing unit 20A to the DC power supply unit 10, the control circuit unit 40 that controls the DC power supply unit 10, the pulsing unit 20A and the regeneration unit 30, and the arc detecting circuit 61, the pulse output being supplied to the load 4 via an output cable 3. In the control of the drive circuit 23 of the pulsing unit 20A, the control circuit unit 40 performs the pulse cycle control for controlling the pulse mode and the arc mode and the suspension/restart control for resetting the magnetic saturation.

Figure 15:
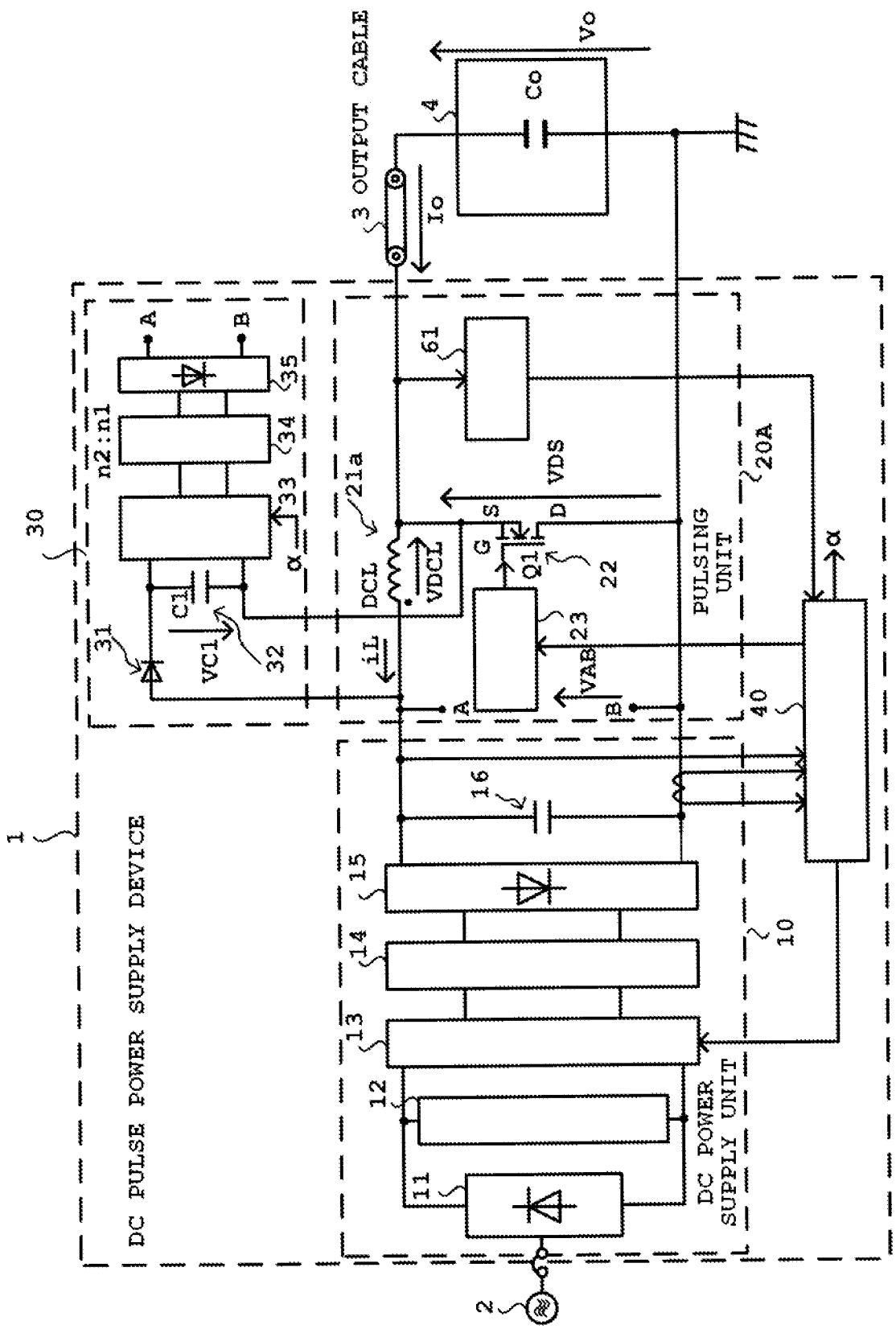
FIG. 15 is a block diagram illustrating a first configuration example comprising a regeneration unit as voltage clamping unit regarding the configuration example of the DC pulse power supply of the invention.
Figure 16:
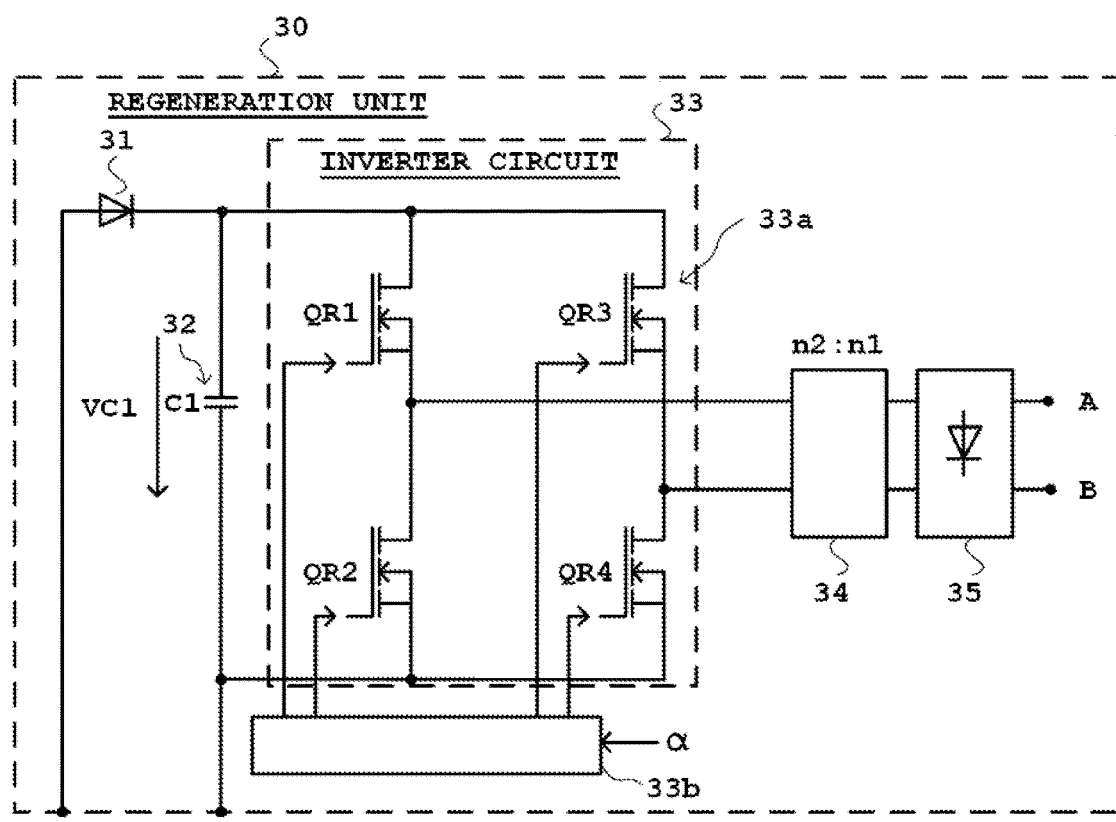
FIG. 16 illustrates a circuitry example of the regeneration unit of a DC pulse power supply device of the invention.

Although FIG. 15 shows an example of using the plasma generation device as the load 4, the load 4 is not limited to the plasma generation device and may be applied to an exciting of a pulse laser, an electrical discharge machine or similar.

(DC Power Supply Unit)

The DC power supply unit (DC unit) 10 comprises a rectifier 11 that rectifies an AC voltage in an AC power supply 2 to a DC voltage, a snubber circuit 12 that absorbs and suppresses a high voltage spike transiently generated during rectification, a single-phase inverter circuit 13 that changes the DC voltage into an AC voltage, a single-phase transformer 14 that transforms the AC voltage in the single-phase inverter circuit 13 to a predetermined voltage value, a rectifier 15 that rectifies the AC voltage transformed by the single-phase transformer 14 to a DC voltage, and a capacitor (CF) 16 that uses a both-end voltage as a DC voltage of the DC power supply unit. One end of the capacitor 16 is grounded, and a negative low-voltage is applied at the other end thereof. The configuration in FIG. 15 shows a capacitive load of the plasma generation device as an example of the load 4. In this configuration, as one end of the plasma generation device is grounded to supply the negative voltage, the DC power supply unit 10 is configured to generate a pulse output of the negative voltage.

The single-phase inverter circuit 13 performs a switching operation in response to a control signal sent from the control circuit unit 40, so as to change the DC voltage into an AC voltage with a predetermined frequency. Each circuit element of the rectifiers 11, 15, the snubber circuit 12, the single-phase inverter circuit 13 and the single-phase transformer 14, which compose the DC power supply unit 10, may be any circuitry that is commonly known.

(Pulsing Unit)

The pulsing unit 20A generates a pulse waveform from the DC voltage by the step-up chopper circuit. The step-up chopper circuit comprises a DC reactor 21a connected in series between the DC power supply and the load, a switching element (Q1) 22 connected in parallel to the load, and the drive circuit 23 for controlling an ON/OFF operation of the switching element 22. The pulsing unit 20A is provided on its DC power supply side with a grounded terminal B and a terminal A of negative voltage as low-voltage side. The illustrated switching element 22 is an example of FET, in which a source S is connected to the low-voltage side and a drain D is connected to a grounded-voltage side, thereby inputting a drive signal from the drive circuit 23 to a gate G.

The control circuit unit 40 generates a signal for setting a time width or duty ratio between an ON time and an OFF time of the switching element 22 with respect to a target pulse output in order to activate the step-up chopper circuit, as well as generating a control signal based on a voltage and current at the output end of the DC power supply unit 10.

The drive circuit 23 outputs the drive signal based on the control signal from the control circuit unit 40 to the gate G of the switching element 22, thereby making the switching element 22 to perform the ON/OFF operation.

The source S of the switching element 22 is connected to the load side of the DC reactor 21a, and the drain D of the switching element 22 is grounded. When the switching element 22 is in the ON state, the load side of the DC reactor 21a is grounded, and thereby a current flows from the terminal B to terminal A through the switching element 22 in the ON state and the DC reactor 21a. At this time, electromagnetic energy is accumulated in the DC reactor 21a. Then, when the switching element 22 is turned from the ON state to the OFF state, a reactor voltage VDCL is generated in the DC reactor 21a by the accumulated energy in the DC reactor 21a. By repeating the ON and OFF operation of the switching element 22, the step-up chopper circuit can boost an output voltage Vo according to the duty ratio of the time widths of the ON and OFF times.

(Regeneration Unit)

The regeneration unit 30 regenerates to the DC power supply a component of the DC reactor voltage in the DC reactor of the step-up chopper circuit that exceeds the set voltage. The regeneration unit 30 comprises a diode 31, a capacitor (C1) 32, an inverter circuit 33, a transformer 34 and a rectifier 35.

One end of the capacitor (C1) 32 is connected to an end on the load side of the DC reactor 21a, and the other end is connected to an end on the DC power supply side of the DC reactor 21a via the diode 31, so that the DC reactor voltage generated in the DC reactor 21a is applied. A capacitor voltage VC1 of the capacitor (C1) 32 is defined on the basis of a DC voltage VAB of the DC power supply and a transformer ratio of the transformer, and when the transformer ratio of the transformer 34 is (n2:n1), the set voltage is VC1=(n2/n1)×VAB. The diode 31 is connected in such a way that a direction from the pulsing unit 20a toward the capacitor (C1) 32 of the regeneration unit 30 is a forward direction, and when the DC reactor voltage VDCL of the DC reactor 21a exceeds the capacitor voltage VC1 of the capacitor (C1) 32, the regeneration unit 30 regenerates a component of the DC reactor voltage VDCL that exceeds the capacitor voltage VC1 of the capacitor (C1) 32. Thus, the regeneration unit 30 performs the regeneration operation by using the capacitor voltage VC1 of the capacitor (C1) 32 as a threshold value.

As to a method for defining the capacitor voltage VC1, there is a solution to vary the transformer ratio of the transformer 34 as well as controlling the output of the inverter circuit 33. Such solution can be, for example, PWM control or phase-shift control, but is not limited thereto and any solution that controls the output of the inverter circuit may be adopted.

Furthermore, in the circuitry shown in FIG. 15, the regeneration unit 30 is configured such that one end of the regeneration unit is connected to a low-voltage input end of the pulsing unit 20A, so as to regenerate the DC reactor voltage VDCL of the DC reactor 21a as the regeneration input voltage Vin based on a voltage on the low-voltage side (negative voltage).

The inverter circuit 33 performs orthogonal transformation between the DC voltage in the capacitor 32 and the AC voltage in the transformer 34, to thereby keep the capacitor voltage VC1 of the capacitor (C1) 32 to a constant voltage level based on the DC voltage VAB of the DC power supply, and when the DC reactor voltage VDCL exceeds the capacitor voltage VC1 of the capacitor (C1) 32, change the exceeded voltage component into an AC voltage to regenerate it to the DC power supply. Since the capacitor voltage VC1 is maintained to the constant voltage level, the DC reactor voltage VDCL in the DC reactor 21a is clamped to the capacitor voltage VC1. The inverter circuit 33 can be configured with a bridge circuit of the switching element, by way of example. The switching element is open and closed by the control in response to a control signal ca from the control circuit unit 40.

The transformer 34 modulates a voltage ratio between the DC voltage VAB of the DC power supply unit 10 and the capacitor voltage VC1 of the capacitor (C1) 32 based on the transformer ratio. When the transformer ratio of the transformer 34 is (n2:n1), the relationship of the voltages between the DC voltage VAB and the capacitor voltage VC1 can be represented by VC1=(n2/n1)×VAB.

The rectifier 35 rectifies the AC voltage in the transformer 34 to the DC voltage in the DC power supply unit 10. The terminal on the DC side of the rectifier 35 is connected to the terminals A, B of the DC power supply unit 10, so that electric power is regenerated to the DC power supply unit 10 only when the capacitor voltage VC1 exceeds a voltage based on the DC voltage VAB.

The configuration of the regeneration unit 30 is not limited to the above-described one if the configuration includes a function of clamping the voltage across the DC reactor 21a to a predetermined voltage and a function of regenerating a component of electric power exceeding the predetermined voltage to the DC power supply.

(Configuration Example of Regeneration Unit)

Referring to FIG. 16, a description will be made about the circuitry of the inverter circuit included in the regeneration unit of the DC pulse power supply device.

The regeneration unit 30 includes the inverter circuit 33 that outputs to the transformer 34 an AC voltage obtained by performing orthogonal transformation on the DC voltage of the capacitor voltage VC1 in the capacitor (C1) 32. The inverter circuit 33 comprises a bridge circuit 33a consisting of switching elements QR1 to QR4, and a drive circuit 33b that generates a drive signal for driving the switching elements QR1 to QR4 based on a control signal α. In here, a full-bridge circuit is used as an example of the bridge circuit 33a, but the circuit 33a may be a half-bridge circuit or multi-phase inverter circuit.

(Second Configuration of DC Pulse Power Supply Device)

Figure 17:
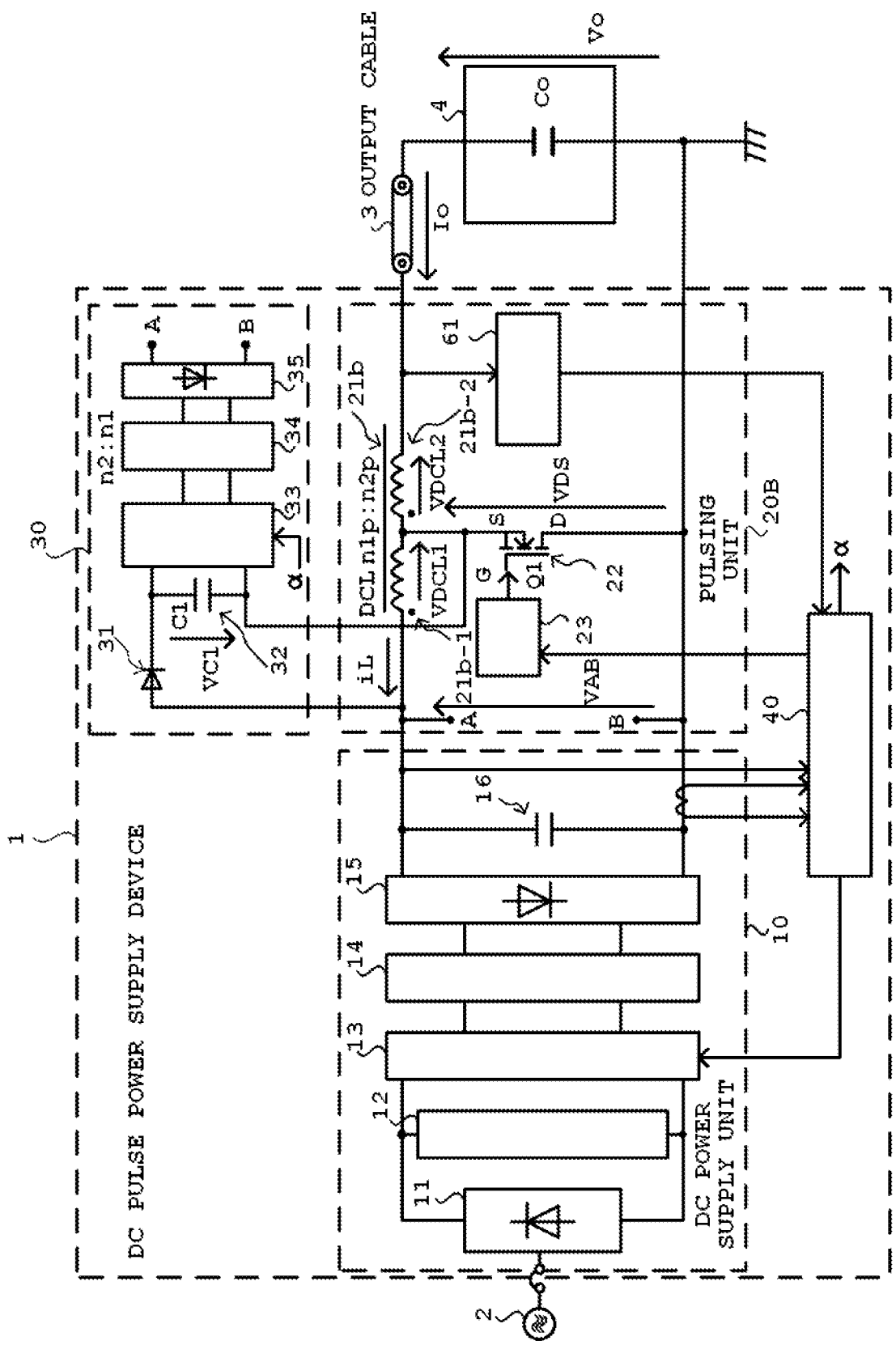
FIG. 17 is a block diagram illustrating a second configuration example comprising the regeneration unit as voltage clamping unit regarding the configuration example of the DC pulse power supply of the invention.

A second configuration example of the DC pulse power supply device of the present invention will be described by referring to FIG. 17. The second configuration example is different from the first configuration example in the step-up chopper circuit in the pulsing unit 20B, and is the same as the first configuration example in the other constituent elements. Next, a description will be made about the constituent element that differs from that of the first configuration example, and the description about the other common elements will be omitted.

The DC reactor 21a included in the step-up chopper circuit of the first configuration example is composed of a single coil. By contrast, the DC reactor 21b of the second configuration example is composed of a tapped autotransformer, instead of the single coil of the step-up chopper circuit of the first configuration example. The DC reactor 21b of the tapped autotransformer can be configured by connecting magnetically coupled first DC reactor 21b-1 and second DC reactor 21b-2 in series, and a connection point between the first DC reactor 21b-1 and the second DC reactor 21b-2 is used as a tapping point. One end of the first DC reactor 21b-1 is connected to the terminal A on the low-voltage side of the DC power supply, whereas one end of the second DC reactor 21b-2 is connected to the load side, and the tapping point of the connection point between the first DC reactor 21b-1 and the second DC reactor 21b-2 is connected to the source S of the switching element 22.

When the switching element 22 is in the ON state, the tapping point of the connection point of the DC reactor 21b is grounded, thereby flowing a current from the terminal B to the terminal A through the switching element 22 in the ON state and the first DC reactor 21b-1 of the DC reactor 21b. At this time, electromagnetic energy is accumulated in the first DC reactor 21b-1.

Then, when the switching element 22 is turned from the ON state to the OFF state, a reactor current iL flown by the accumulated energy in the first DC reactor 21b-1 of the DC reactor 21b causes the generation of a DC reactor voltage VDCL1 in the first DC reactor 21b-1 and a DC reactor voltage VDCL2 in the second DC reactor 21b-2. By repeating the ON and OFF operation of the switching element 22, the step-up chopper circuit can boost the output voltage Vo as with the case of the first configuration example.

The voltage ratio between the DC reactor voltage VDCL1 of the first DC reactor 21b-1 and the DC reactor voltage VDCL2 of the second DC reactor 21b-2 corresponds to an inductance ratio between the first DC reactor 21b-1 and the second DC reactor 21b-2. When a turns ratio of the tapped single-turning coils of the first DC reactor 21b-1 and second DC reactor 21b-2 of the DC reactor 21b is n1p:n2p, the voltage ratio (VDCL1/VDCL2) between the DC reactor voltage VDCL1 of the first DC reactor 21b-1 and the DC reactor voltage VDCL2 of the second DC reactor 21b-2 stands at the turns ratio of (n1p/n2p).

The regeneration unit 30 in the second configuration example performs in the same way as that of the first configuration example by applying the DC reactor voltage VDCL1 of the first DC reactor 21b-1 of the DC reactor 21b, instead of the DC reactor voltage VDCL of the DC reactor 21a in the first configuration example.

In the regeneration unit 30, one end of the capacitor (C1) 32 is connected to the connection point between the first DC reactor 21b-1 and second DC reactor 21b-2 of the DC reactor 21b, whereas the other end thereof is connected to the end part of the DC power supply of the first DC reactor 21b-1 via the diode 31, thereby applying the DC reactor voltage VDCL1 generated in the first DC reactor 21b-1.

The capacitor voltage VC1 of the capacitor (C1) 32 is defined on the basis of the DC voltage VAB of the DC power supply and the transformer ratio of the transformer 34, and when the transformer ratio of the transformer 34 is (n2:n1), the voltage VC1 is a set voltage of VC1=(n2/n1)×VAB. The diode 31 is connected such that a direction from the pulsing unit 20B toward the capacitor (C1) 32 of the regeneration unit 30 is a forward direction, and when the DC reactor voltage VDCL1 in the first DC reactor 21b-1 exceeds the capacitor voltage VC1 in the capacitor (C1) 32, the regeneration unit 30 regenerates a component of the DC reactor voltage VDCL1 that exceeds the capacitor voltage VC1 of the capacitor (C1) 32. In this way, the regeneration unit 30 performs the regeneration operation by using the capacitor voltage VC1 in the capacitor (C1) 32 as a threshold value, as with the case of the first configuration example.

As the output voltage Vo, output is a voltage (Vo=VAB+ VDCL1+VDCL2) obtained by superimposing the DC reactor voltage VDCL1 of the first DC reactor 21b-1 and the DC reactor voltage VDCL2 of the second DC reactor 21b-2 on the DC voltage VAB of the DC power supply. Since the DC reactor voltage VDCL1 of the first DC reactor 21b-1 is clamped to the capacitor voltage VC1, the output voltage Vo stands at Vo=VAB+VC1+VDCL2.

(Third Configuration of DC Pulse Power Supply Device)

Figure 18:
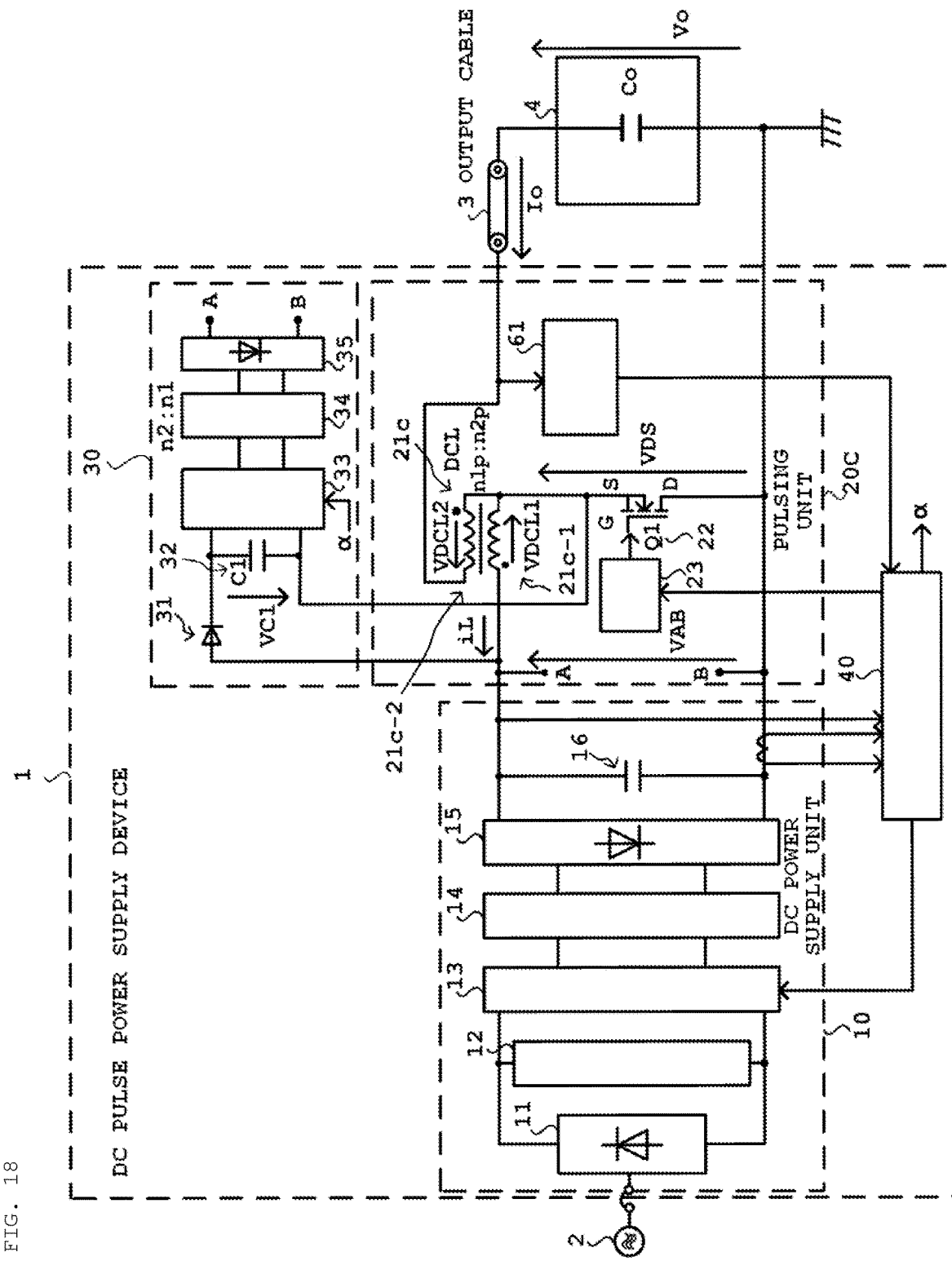
FIG. 18 is a block diagram illustrating a third configuration example comprising the regeneration unit as voltage clamping unit regarding the configuration example of the DC pulse power supply of the invention.

A description will now be made about the third configuration example of the DC pulse power supply device of the invention by referring to FIG. 18. The third configuration example is different from the first and second configuration examples in the step-up chopper circuit in the pulsing unit 20C, and is the same as the first and second configuration examples in the other constituent elements. Next, a description will be made about the constituent element that differs from those of the first and second configuration examples, and the description about the other common elements will be omitted.

The DC reactor 21b included in the step-up chopper circuit of the second configuration example is composed of a tapped autotransformer. By contrast, the DC reactor 21c of the third configuration example is composed of a multi-winding transformer, instead of the tapped autotransformer of the step-up chopper circuit of the second configuration example. The multi-winding transformer of the DC reactor 21c is an example of an additive polarity transformer.

The DC reactor 21c of the multi-winding transformer is configured by connecting magnetically coupled first DC reactor 21c-1 and second DC reactor 21c-2 in parallel. One end of the first DC reactor 21c-1 is connected to the terminal A on the low-voltage side of the DC power supply, and the other end thereof is connected to the end of the source S of the switching element 22. One end of the second DC reactor 21c-2 is connected to the end of the source S of the switching element 22, and the other end is connected to the load side.

When the switching element 22 is in the ON state, the end on the switching element 22 side of the first DC reactor 21c-1 of the DC reactor 21c is grounded, so that a current flows from the terminal B to the terminal A through the switching element 22 in the ON state and the first DC reactor 21c. At this time, electromagnetic energy is accumulated in the first DC reactor 21c.

Then, when the switching element 22 is turned from the ON state to the OFF state, a DC reactor current iL flown by the accumulated energy in the first DC reactor 21c-1 of the DC reactor 21c causes the generation of the DC reactor voltage VDCL1 in the first DC reactor 21c-1, and the electromagnetic coupling of the second DC reactor 21c-2 with the first DC reactor 21c-1 causes the generation of the DC reactor voltage VDCL2 in the second DC reactor 21c-2. By repeating the ON and OFF operation of the switching element 22, the step-up chopper circuit can boost the output voltage Vo as with the case of the first and second configuration examples.

A voltage ratio between the DC reactor voltage VDCL1 of the first DC reactor 21c-1 and the DC reactor voltage VDCL2 of the second DC reactor 21c-2 stands at a value corresponding to an inductance ratio between the first DC reactor 21c-1 and the second DC reactor 21c-2. When a turns ratio of the multi-turning coils of the first DC reactor 21c-1 and second DC reactor 21c-2 of the DC reactor 21c is (n1p:n2p), the voltage ratio (VDCL1/VDCL2) between the DC reactor voltage VDCL1 of the first DC reactor 21c-1 and the DC reactor voltage VDCL2 of the second DC reactor 21c-2 stands at the turns ratio of (n1p/n2p).

The regeneration unit of the third configuration example performs in the way similar to the case in the regeneration unit for the DC reactor voltage VDCL1 of the first DC reactor 21b-1 of the DC reactor 21b of the second configuration example.

In the regeneration unit 30, one end of the capacitor (C1) 32 is connected to an end of the switching element of the first DC reactor 21c-1 of the DC reactor 21c and the other end is connected to an end on the DC power supply side of the first DC reactor 21c-1 via the diode 31, so as to apply the reactor voltage VDCL1 generated in the first DC reactor 21c-1. The capacitor voltage VC1 in the capacitor (C1) 32 is defined on the basis of the DC voltage VAB of the DC power supply and the transformer ratio of the transformer, and when the transformer ratio of the transformer 34 is (n2:n1), a set voltage is VC1=(n2/n1)×VAB. The diode 31 is connected such that a direction from the pulsing unit toward the capacitor (C1) 32 of the regeneration unit 30 is a forward direction, and when the DC reactor voltage VDCL1 of the first DC reactor 21c-1 exceeds the capacitor voltage VC1 of the capacitor (C1) 32, the regeneration unit 30 regenerates a component of the reactor voltage VDCL1 that exceeds the capacitor voltage VC1 of the capacitor (C1) 32. In this way, the regeneration unit 30 performs the regeneration operation by using the capacitor voltage VC1 of the capacitor (C1) 32 as a threshold value, as with the cases of the first and second configuration examples.

As the output voltage Vo, output is a voltage (Vo=VAB+ VDCL1+VDCL2) obtained by superimposing the DC reactor voltage VDCL1 of the first DC reactor 21c-1 and the DC reactor voltage VDCL2 of the second DC reactor 21c-2 on the DC voltage VAB of the DC power supply. Since the DC reactor voltage VDCL1 of the first DC reactor 21b-1 is clamped to the capacitor voltage VC1, the output voltage Vo is Vo=VAB+VC1+VDCL2. When a turns ratio of the first DC reactor 21c-1 and the second DC reactor 21c-2 is (n1p/n2p), the DC reactor voltages VDCL1 and VDCL2 are represented by (VDCL1/VDCL2=n1p/n2p).

(Fourth Configuration of DC Pulse Power Supply Device)

Figure 19:
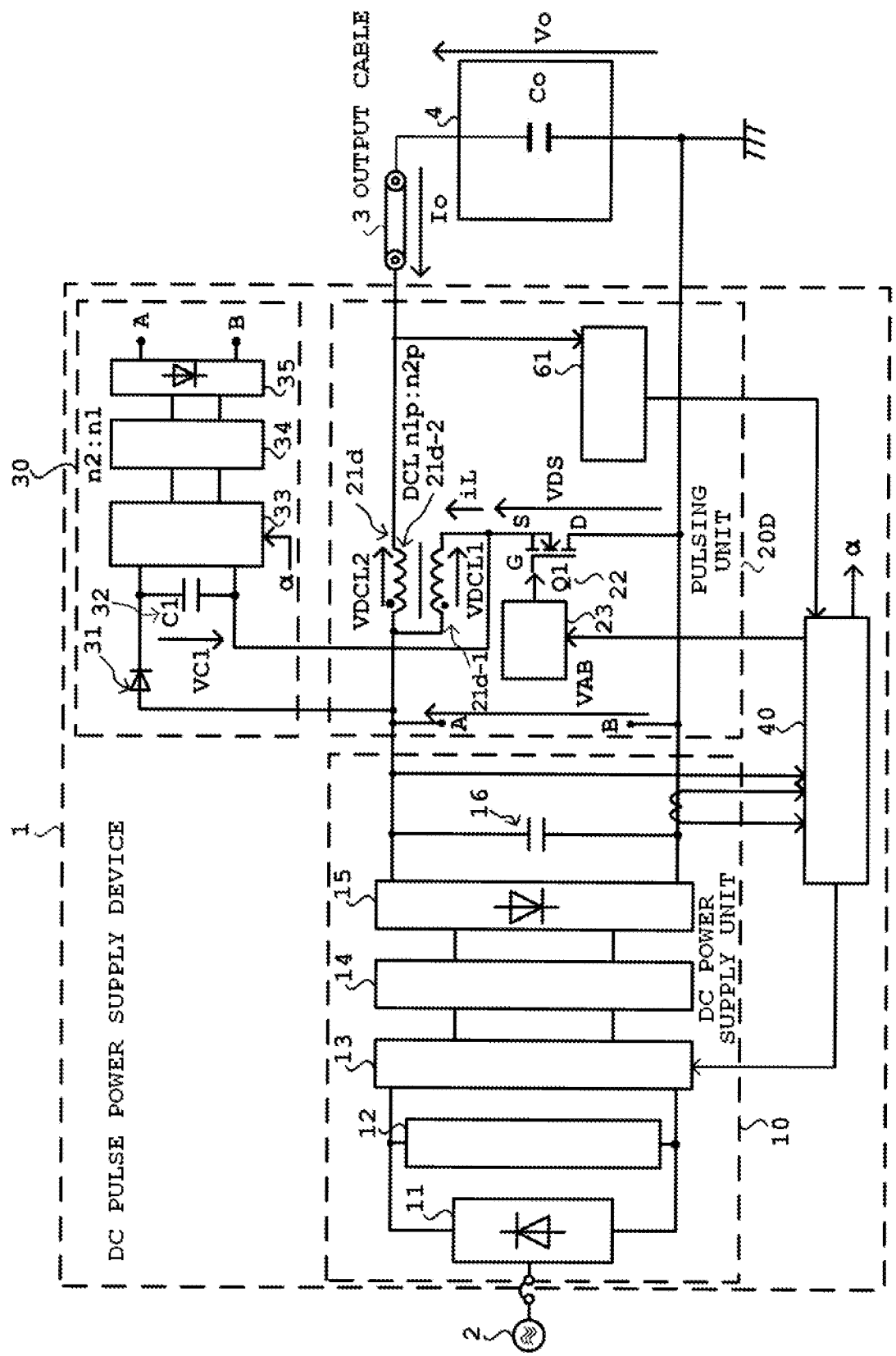
FIG. 19 is a block diagram illustrating a fourth configuration example comprising the regeneration unit as voltage clamping unit regarding the configuration example of the DC pulse power supply of the invention.

A description will now be made about the fourth configuration example of the DC pulse power supply device of the invention by referring to FIG. 19. The fourth configuration example is different from the third configuration example in the transformer that constitutes the step-up chopper circuit in the pulsing unit 20D, and is the same as the third configuration example in the other constituent elements.

The DC reactor 21c included in the step-up chopper circuit of the third configuration example is composed of the multi-winding transformer with the additive polarity. By contrast, the DC reactor 21d of the fourth configuration example is composed of a multi-winding transformer with a subtractive polarity, instead of the multi-winding transformer with the additive polarity of the step-up chopper circuit of the third configuration example.

The DC reactor 21d of the multi-winding transformer is configured by connecting magnetically coupled first DC reactor 21d-1 and second DC reactor 21d-2 in parallel. One end of the first DC reactor 21d-1 is connected to the terminal A on the low-voltage side of the DC power supply, and the other end thereof is connected to the source S of the switching element 22. One end of the second DC react 21d-2 is connected to the terminal A on the low-voltage side of the DC power supply, and the other end is connected to the load side.

When the switching element 22 is in the ON state, the end on the switching element 22 side of the first DC reactor 21d-1 of the DC reactor 21d is grounded, so that a current flows from the terminal B to the terminal A through the switching element 22 in the ON state and the first DC reactor 21d-l. At this time, electromagnetic energy is accumulated in the first DC reactor 21d-1.

Then, when the switching element 22 is turned from the ON state to the OFF state, a DC reactor current iL flown by the accumulated energy in the first DC reactor 21d-1 of the DC reactor 21d causes the generation of the DC reactor voltage VDCL1 in the first DC reactor 21d-1, and the electromagnetic coupling of the second DC reactor 21d-2 with the first DC reactor 21d-1 causes the generation of the DC reactor voltage VDCL2 in the second DC reactor 21d-2. By repeating the ON and OFF operation of the switching element 22, the step-up chopper circuit can boost the output voltage Vo as with the cases of the first, second and third configuration examples.

A voltage ratio between the DC reactor voltage VDCL1 of the first DC reactor 21d-1 and the DC reactor voltage VDCL2 of the second DC reactor 21d-2 stands at a value corresponding to an inductance ratio between the first DC reactor 21d-1 and the second DC reactor 21d-2. When a turns ratio of the multi-turning coils of the first DC reactor 21d-1 and second DC reactor 21d-2 of the DC reactor 21d is (n1p:n2p), the voltage ratio (VDCL1/VDCL2) between the DC reactor voltage VDCL1 of the first DC reactor 21d-1 and the DC reactor voltage VDCL2 of the second DC reactor 21d-2 stands at the turns ratio of (n1p/n2p).

The DC reactor 21d of the regeneration unit of the fourth configuration example performs in the way similar to the case in the DC reactor 21c for the DC reactor voltage VDCL1 of the first DC reactor 21c of the third configuration example.

In the regeneration unit 30, one end of the capacitor (C1) 32 is connected to an end of the switching element of the first DC reactor 21d-1 of the DC reactor 21d and the other end is connected to an end on the DC power supply side of the first DC reactor 21d-1 via the diode 31, so as to apply the DC reactor voltage VDCL1 generated in the first DC reactor 21d-1. The capacitor voltage VC1 in the capacitor (C1) 32 is defined on the basis of the DC voltage VAB of the DC power supply and the transformer ratio of the transformer, and when the transformer ratio of the transformer 34 is (n2:n1), a set voltage is VC1=(n2/n1)×VAB.

The diode 31 is connected such that a direction from the pulsing unit toward the capacitor (C1) 32 of the regeneration unit 30 is a forward direction, and when the DC reactor voltage VDCL1 of the first DC reactor 21d-1 exceeds the capacitor voltage VC1 of the capacitor (C1) 32, the regeneration unit 30 regenerates a component of the DC reactor voltage VDCL1 that exceeds the capacitor voltage VC1 of the capacitor (C1) 22. In this way, the regeneration unit 30 performs the regeneration operation by using the capacitor voltage VC1 of the capacitor (C1) 32 as a threshold value, as with the cases of the first, second and third configuration examples.

As the output voltage Vo, output is a voltage (Vo=VAB+VDCL2) obtained by superimposing the DC reactor voltage VDCL2 of the second DC reactor 21d-2 on the DC voltage VAB of the DC power supply. When a turns ratio of the first DC reactor 21d-1 and the second DC reactor 21d-2 is (n1p/n2p), the DC reactor voltages VDCL1 and VDCL2 are represented by (VDCL1/VDCL2=n1p/n2p). Thus, when the voltage VDCL1 is clamped to the voltage VC1, the output voltage Vo is represented by Vo=VAB+VC1×(n1p/n2p).

(Fifth Configuration of DC Pulse Power Supply Device)

Figure 20:
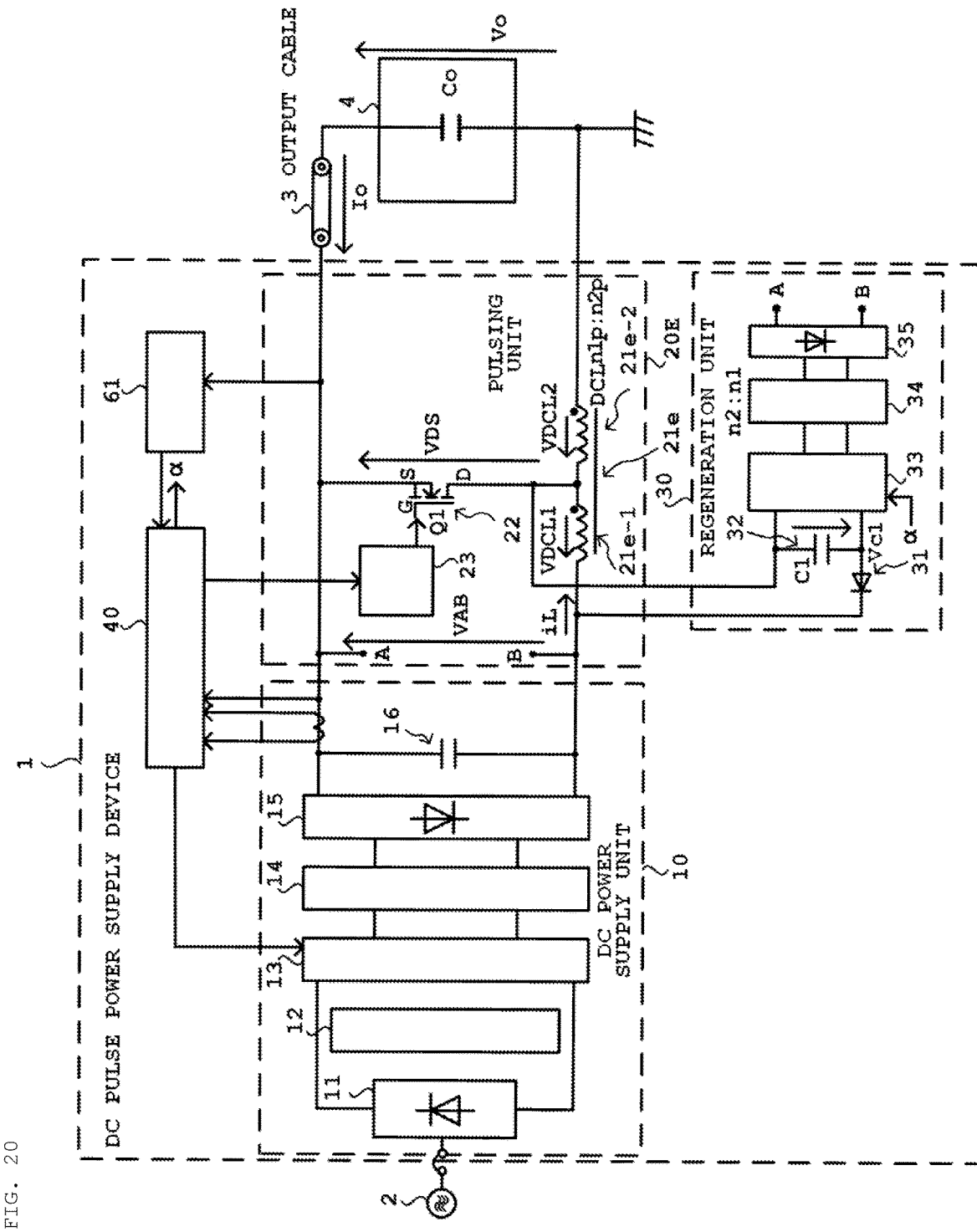
FIG. 20 is a block diagram illustrating a fifth configuration example comprising the regeneration unit as voltage clamping unit regarding the configuration example of the DC pulse power supply of the invention.
Figure 21A:
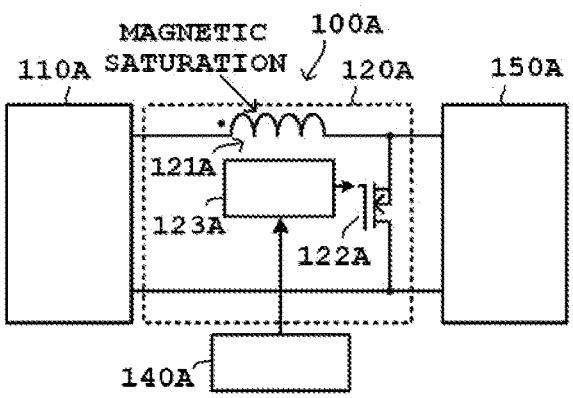
FIGS. 21(*a*) to 21(*d*) illustrate a conventional configuration example and a configuration example comprising a voltage clamping unit of the DC pulse power supply device.
Figure 21B:
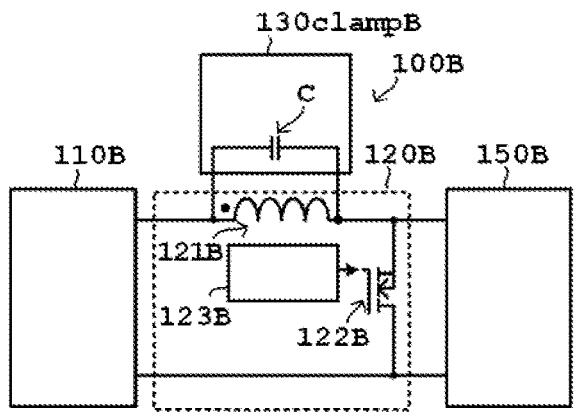
Figure 21C:
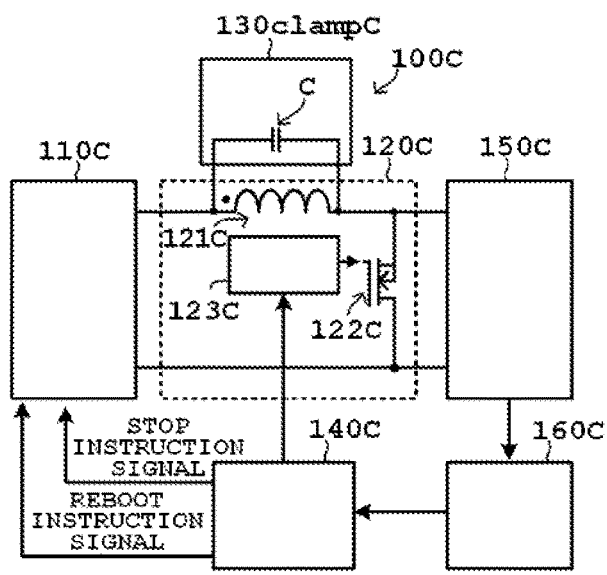
Figure 21D:
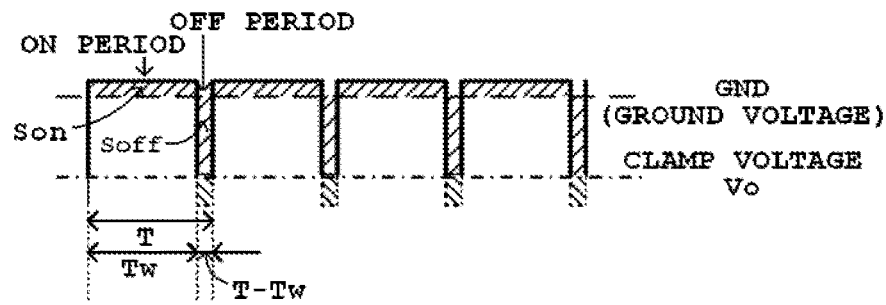
Figure 22:
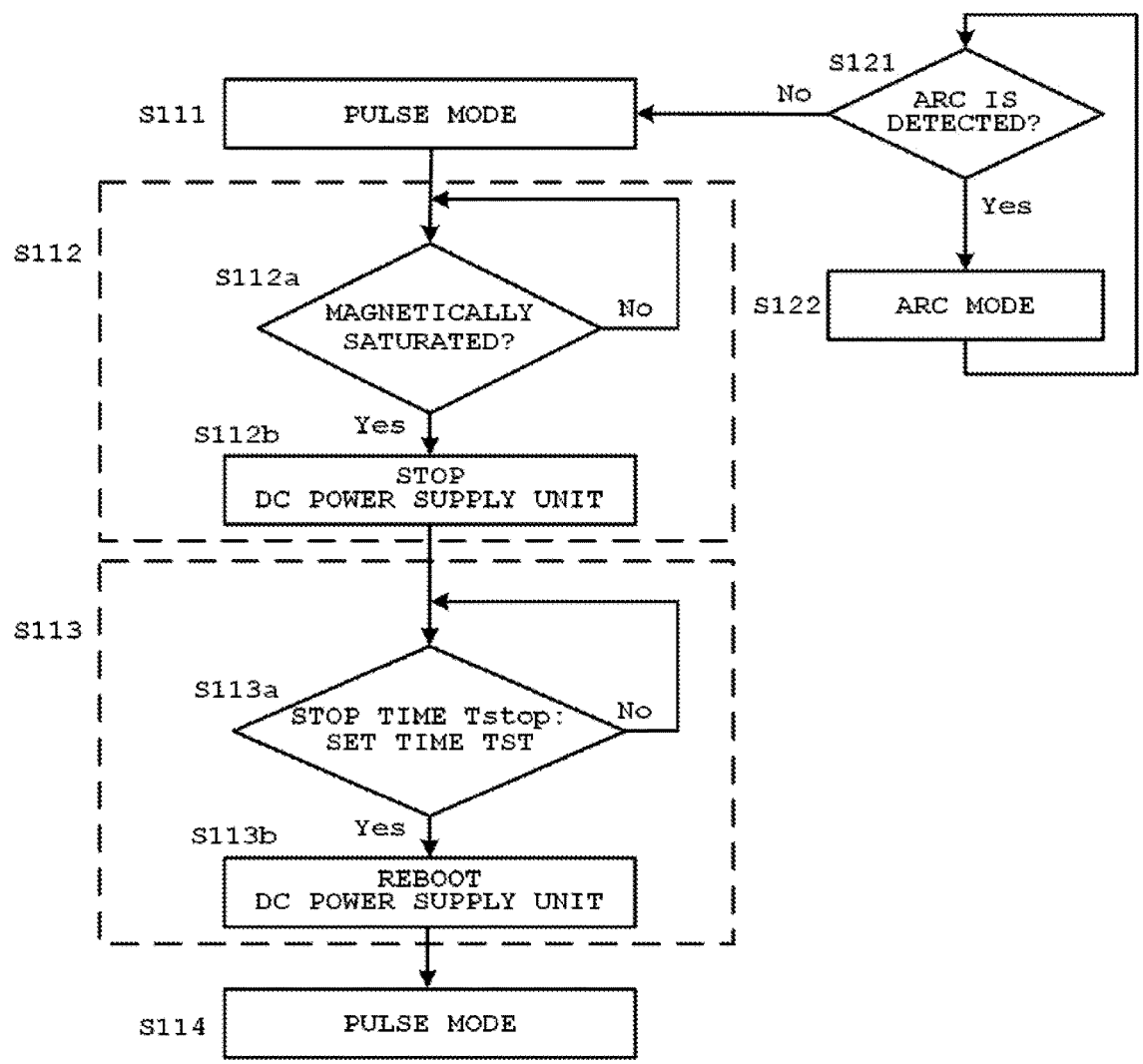
FIG. 22 is a flowchart illustrating an operation for stopping a DC power supply unit to reset magnetic saturation.
Figure 23:
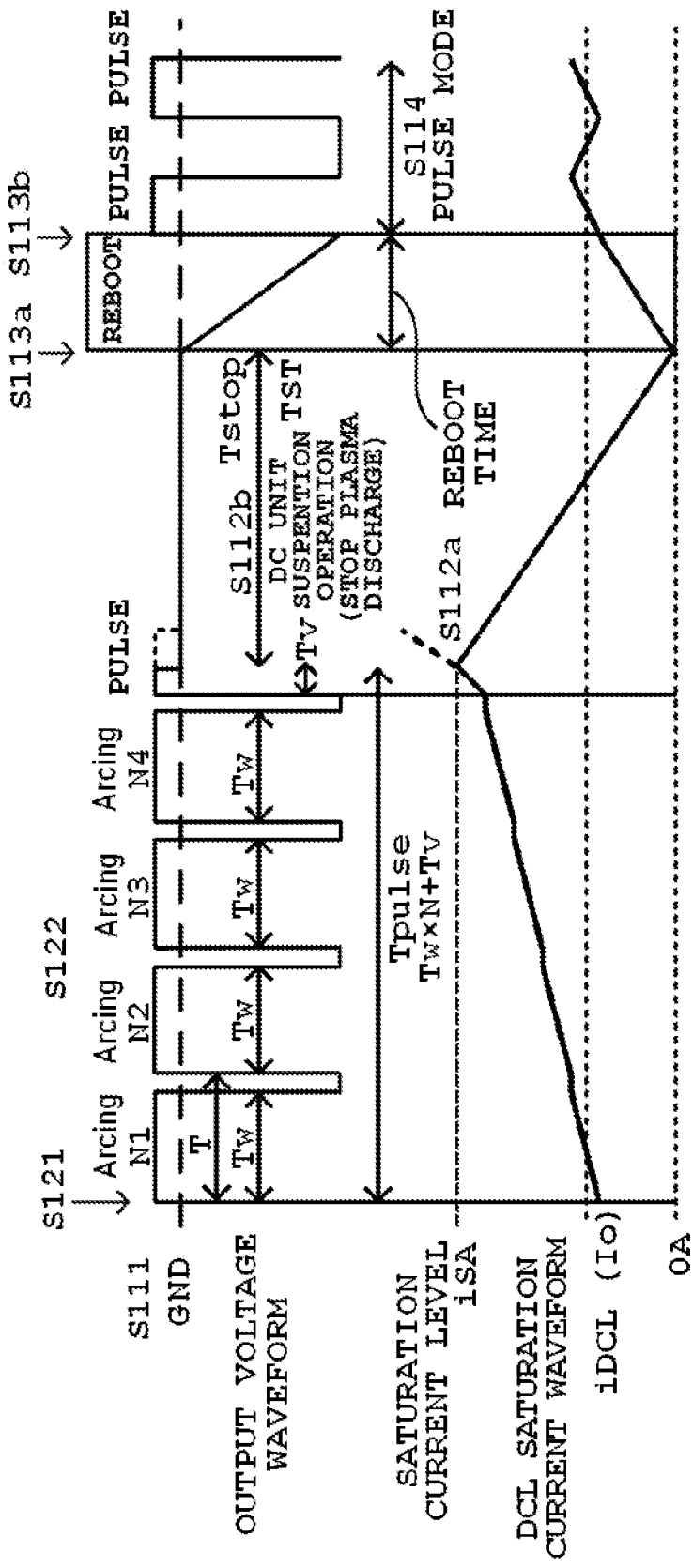
FIG. 23 is a waveform chart illustrating the operation for stopping the DC power supply unit to reset the magnetic saturation.

A description will be made about the fifth configuration example of the DC pulse power supply device of the present invention by referring to FIG. 20. The fifth configuration example is different from the second configuration example in the arrangement of the DC reactor of the step-up chopper circuit, and is the same as the second configuration example in the other constituent elements. In the following, the difference from the second configuration example will be described, and the description about the other common elements will be omitted.

A DC reactor 21e included in the step-up chopper circuit of the fifth configuration example is composed of a trapped autotransformer, as with the DC reactor 21b of the step-up chopper circuit of the second configuration example, but is different in its arrangement with respect to a power line. The DC reactor 21b of the second configuration example is connected to a power line on the low-voltage side of the DC power supply, whereas the DC reactor 21e of the fifth configuration example is connected to a power line on the high-voltage side of the DC power supply.

The DC reactor 21e of the tapped autotransformer is configured by connecting magnetically coupled first DC reactor 21e-1 and second DC reactor 21e-2 in series, and uses a connection point between the first DC reactor 21e-1 and the second DC reactor 21e-2 as tapping point. One end of the first DC reactor 21e-1 is connected to the terminal B on the high-voltage side of the DC power supply, and one end of the second DC reactor 21e-2 is connected to the load side and further grounded. The tapping point of the connection point of the first DC reactor 21e-1 and the second DC reactor 21e-2 is connected to the end of the drain D of the switching element 22.

When the switching element 22 is in the ON state, the tapping point of the connection point of the DC reactor 21e is grounded via the second DC reactor 21e-2, so that a current can flow from the terminal B to the terminal A through the first DC reactor 21e-1 and the switching element 22 in the ON state.

At this time, electromagnetic energy is accumulated in the first DC reactor 21e-1.

Then, when the switching element 22 is turned from the ON state to the OFF state, a DC reactor current iL flown by the accumulated energy in the first DC reactor 21e-1 of the DC reactor 21e causes the generation of the DC reactor voltage VDCL1 in the first DC reactor 21e-1, while causing the generation of the DC reactor voltage VDCL2 in the second DC reactor 21e-2. By repeating the ON and OFF operation of the switching element 22, the step-up chopper circuit can boost the output voltage Vo as with the case of the first configuration example.

A voltage ratio between the DC reactor voltage VDCL1 of the first DC reactor 21e-1 and the DC reactor voltage VDCL2 of the second DC reactor 21e-2 stands at a value corresponding to an inductance ratio between the first DC reactor 21e-1 and the second DC reactor 21e-2. When a turns ratio of a tapped single-winding coils of the first DC reactor 21e-1 and the second DC reactor 21e-2 of the DC reactor 21 is n1p:n2p, the voltage ratio (VDCL1/VDCL2) between the DC reactor voltage VDCL1 of the first DC reactor 21e-1 and the DC reactor voltage VDCL2 of the second DC reactor 21e-2 stands at the turns ratio of (n1p/n2p).

The regeneration unit 30 of the fifth configuration example can perform in the manner similar to the case in the first configuration example by employing the DC reactor voltage VDCL1 of the first DC reactor 21e-1 of the DC reactor 21e instead of the DC reactor voltage VDCL of the DC reactor 21a of the first configuration example.

In the regeneration unit 30, one end of the capacitor (C1) 32 is connected to the connection point between the first DC reactor 21e-1 and second DC reactor 21e-2 of the DC reactor 21e and the other end is connected on the end part of the DC power supply of the first DC reactor 21e-1 via the diode 31, thereby applying the DC reactor voltage VDCL1 generated in the first DC reactor 21e-1.

The capacitor voltage VC1 of the capacitor (C1) 32 is defined based on the DC voltage VAB of the DC power supply and the transformer ratio of the transformer, and when the transformer ratio of the transformer 34 is (n2:n1), a set voltage is VC1=(n2/n1)×VAB. The diode 31 is connected such that a direction from the pulsing unit 20D toward the capacitor (C1) 32 of the regeneration unit 30 is a reversed direction, and when the DC reactor voltage VDCL1 of the first DC reactor 21e-1 exceeds the capacitor voltage VC1 of the capacitor (C1) 32, the regeneration unit 30 regenerates a component of the DC reactor voltage VDCL1 that exceeds the capacitor voltage VC1 of the capacitor (C1) 32. Thus, the regeneration unit 30 performs the regeneration operation by using the capacitor voltage VC1 of the capacitor (C1) 32 as a threshold value, as with the case of the first configuration example.

As the output voltage Vo, output is a voltage (Vo=VAB+VDCL1+VDCL2) obtained by superimposing the DC reactor voltage VDCL1 of the first DC reactor 21e-1 and the DC reactor voltage VDCL2 of the second DC reactor 21e-2 on the DC voltage VAB of the DC power supply. Since the DC reactor voltage VDCL1 of the first DC reactor 21e-1 is clamped to the voltage VC1, the output voltage Vo is represented by Vo=VAB+VC1+VDCL2.

In the DC pulse power supply device shown in the first configuration example to the fifth configuration example, the capacitor (C1) 32 of the regeneration unit and the capacitor C for the magnetic saturation reset can be used together to thereby resetting the magnetic saturation of the DC reactors 21a to 21e.

In the first to fifth configurations of the DC pulse power supply device, the control circuit unit comprises the switching cycle control unit for controlling the cycle of the switching operation of the switching element, and the suspension/restart control unit for controlling the suspension and the restart of the switching operation of the switching element, wherein the switching cycle control unit performs the cycle control for generating the output pulse in the pulse mode and the arc mode, and the suspension/restart control unit performs the suspension/restart control for resetting the magnetic saturation of the DC reactor.

The description about the above embodiments and modifications are examples of the DC pulse power supply device in accordance with the present invention. The present invention is therefore not limited to the above embodiments and can be changed of modified in various ways on the basis of the ideas of the invention, and these variations are not excluded from the scope of the invention.

INDUSTRIAL APPLICABILITY

The DC pulse power supply device of the present invention can be applied as power supply for supplying electric power to a plasma generation device, and furthermore can be used as power supply device for supplying a pulse output to, for instance, a load for exciting a pulse laser, or of an electric discharge machine.

REFERENCE SIGNS LIST

1 DC Pulse Power Supply Device
2 AC Power Supply
3 Output Cable
4 Load
10 DC Power Supply Unit
11 Rectifier
12 Snubber Circuit
13 Single-Phase Inverter Circuit
14 Single-Phase Transformer
15 Rectifier
16 Capacitor
20, 20A, 20B, 20C, 20D Pulsing Unit
21 DC Reactor
21b-1 Primary Coil
21b-2 Secondary Coil
21a-21e DC Reactor
22 Switching Element
23 Drive Circuit
30 Regeneration Unit
30clamp Voltage Clamping Unit
31 Diode
32 Capacitor
33 Inverter Circuit
33a Bridge Circuit
33b Drive Circuit
34 Transformer
35 Rectifier
40 Control Circuit Unit
40A Switching Cycle Control Unit
40B, 40B, 40C, 40D, 40E Suspension/Restart Control Unit
41 Accumulated Pulse Width Computing Unit
42 Pulse Width Comparing Unit
43 Suspension Time Comparing Unit
44 Saturation Level Comparing Unit
50 Pulse Mode Level Comparing Unit
50 Load 60 Load State Detecting Unit
61 Arc Detecting Unit
80 DC Reactor Current Detecting Unit
100A, 100B, 100C DC Pulse Power Supply Device
110A, 110B, 110C DC Power Supply Unit
120A, 120B, 120C Pulsing Unit
121A, 121B, 121C DC Reactor
122A, 122B, 122C Switching Element
123A, 123B, 123C Drive Circuit
130clampB, 130clampC Voltage Clamping unit
140A, 140C Control Circuit Unit
150A, 150B, 150C Load
160C Arc Detecting Unit
T Pulse Cycle
TP Set Pulse Width
TRE Set Time
TST Set Time
Toff OFF Period
Ton ON Period
Tpulse Accumulated Pulse Width
Treset Suspension Time
Tstop Stop Time
Tw Time Width
VAB DC Voltage
VC1 Capacitor Voltage
VDCL DC Reactor Voltage
VDCL1 DC Reactor Voltage
VDCL2 DC Reactor Voltage
VDS Drain-Source Voltage
Vin Regeneration Input Voltage
Vo Output Voltage
iDCL DC Reactor Current
iPA Pulse Mode Level
iSA Saturation Current Level
ireset Reset Current
α Control Signal

The invention claimed is:

1. A DC pulse power supply device, comprising:
a DC power supply unit;
a pulsing unit that comprises a series circuit composed of a DC reactor and a switching element, and generates a pulse output from a DC voltage in the DC power supply unit;
a voltage clamping unit that comprises a capacitor connected in parallel to the DC reactor of the pulsing unit, and uses a capacitor voltage in the capacitor to limit a voltage across the DC reactor to a clamp voltage; and
a control circuit unit that controls an ON/OFF operation of the switching element of the pulsing unit, wherein the control circuit unit comprises:
a switching cycle control unit that controls a duty of a switching operation of the switching element; and
a suspension/restart control unit that controls suspension and restart of the switching operation of the switching element,
the suspension/restart control unit performs the following operations,
at the time that the DC reactor reaches magnetic saturation:
bringing the switching element into an OFF state to suspend the switching operation; and
applying the DC voltage to a load during a suspension time of the switching element, and resetting the magnetic saturation by using a DC reactor voltage which is clamped to the capacitor voltage, and
at the time that the magnetic saturation of the DC reactor is reset:
restarting a drive operation of the switching element.

2. The DC pulse power supply device according to claim 1, wherein the switching cycle control unit has the following two modes:
a pulse mode for supplying a pulse output of steady power; and
an arc mode for supplying a low-power pulse output at a cycle longer than that in the pulse mode.

3. The DC pulse power supply device according to claim 2, wherein the suspension/restart control unit performs the following operations,
suspending the operation of the switching element at the time that an accumulated pulse width in an ON state of the switching element exceeds an allowable time width of the magnetic saturation in the arc mode, and
restarting the operation of the switching element at the time that a suspension time of the switching element exceeds a set time.

4. The DC pulse power supply device according to claim 2, wherein the suspension/restart control unit performs the following operations,
suspending the operation of the switching element at the time that a DC reactor current of the switching element exceeds a magnetic saturation level of the DC reactor current in the arc mode, and
restarting the operation of the switching element at the time that the DC reactor current of the switching element exceeds a pulse mode level of the DC reactor current in the pulse mode.

5. The DC pulse power supply device according to claim 2, wherein the suspension/restart control unit performs the following operations,
suspending the operation of the switching element at the time that the accumulated pulse width in the ON state of the switching element in the arc mode exceeds the allowable time width of the magnetic saturation, and
restarting the operation of the switching element at the time that the DC reactor current of the switching element exceeds the pulse mode level of the DC reactor current in the pulse mode.

6. The DC pulse power supply device according to claim 2, wherein the suspension/restart control unit performs the following operations,
suspending the operation of the switching element at the time that the DC reactor current of the switching element exceeds the magnetic saturation level of the DC reactor current level in the arc mode, and
restarting the operation of the switching element at the time that the suspension time of the switching element exceeds the set time.

7. The DC pulse power supply device according to claim 1, wherein the voltage clamping unit is a regeneration circuit for regenerating a component of the capacitor voltage that exceeds the clamp voltage to the DC power supply unit.

8. A magnetic saturation reset method for a DC pulse power supply device, the DC pulse power supply device comprising:
a DC power supply unit;
a pulsing unit that comprises a series circuit composed of a DC reactor and a switching element, and generates a pulse output from a DC voltage in the DC power supply unit;
a voltage clamping unit that comprises a capacitor connected in parallel to the DC reactor of the pulsing unit, and uses a capacitor voltage in the capacitor to limit a voltage across the DC reactor to a clamp voltage; and a control circuit unit that controls an ON/OFF operation of the switching element of the pulsing unit, wherein control by the control circuit unit includes:

switching cycle control for controlling a duty of a switching operation of the switching element; and suspension/restart control for controlling suspension and restart of the switching operation of the switching element, the switching cycle control has two modes:

a pulse mode for supplying a pulse output of steady power; and an arc mode for supplying a low-power pulse output at a cycle longer than that in the pulse mode, the suspension/restart control performs the following operations, at the time that the DC reactor reaches magnetic saturation:

bringing the switching element into an OFF state to suspend the switching operation; and applying the DC voltage to a load during a suspension time of the switching element, and resetting the magnetic saturation by using a DC reactor voltage which is clamped to the capacitor voltage, and at the time that the magnetic saturation of the DC reactor is reset:

restarting a drive operation of the switching element.

* * * * *